(12) United States Patent
Liu et al.

(10) Patent No.: US 10,403,897 B2
(45) Date of Patent: Sep. 3, 2019

(54) CONDUCTIVE POLYMER BINDER FOR A NOVEL SILICON/GRAPHENE ANODE IN LITHIUM ION BATTERIES

(71) Applicant: Bayerische Motoren Werke Aktiengesellschaft, Munich (DE)

(72) Inventors: Gao Liu, Piedmont, CA (US); Zhe Jia, Emeryville, CA (US); Tianyue Zheng, Albany, CA (US); Hui Zhao, Emeryville, CA (US); Ann-Christin Gentschev, Munich (DE); Thorsten Langer, Munich (DE); Simon Lux, Oakland, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 15/600,071

(22) Filed: May 19, 2017

(65) Prior Publication Data

US 2018/0337407 A1    Nov. 22, 2018

(51) Int. Cl.
| | |
|---|---|
| *H01B 1/20* | (2006.01) |
| *H01M 4/00* | (2006.01) |
| *H01M 4/62* | (2006.01) |
| *H01M 4/133* | (2010.01) |
| *H01M 4/04* | (2006.01) |
| *H01M 4/1393* | (2010.01) |
| *H01M 4/134* | (2010.01) |
| *H01M 4/1395* | (2010.01) |
| *H01M 4/36* | (2006.01) |

(52) U.S. Cl.
CPC .............. *H01M 4/622* (2013.01); *H01B 1/20* (2013.01); *H01M 4/0402* (2013.01); *H01M 4/133* (2013.01); *H01M 4/134* (2013.01); *H01M 4/1393* (2013.01); *H01M 4/1395* (2013.01); *H01M 4/364* (2013.01)

(58) Field of Classification Search
CPC .. H01B 1/00; H01B 1/04; H01B 1/20; H01M 4/133; H01M 4/134; H01M 4/137; H01M 4/38; H01M 4/583
See application file for complete search history.

(56) References Cited

U.S. PATENT DOCUMENTS

| | | | |
|---|---|---|---|
| 8,778,538 B2 | 7/2014 | Kung et al. | |
| 9,153,353 B2 | 10/2015 | Liu et al. | |
| 2009/0176159 A1 | 7/2009 | Zhamu et al. | |
| 2012/0231326 A1 | 9/2012 | Biswal et al. | |
| 2013/0260239 A1 | 10/2013 | Liu et al. | |
| 2013/0288126 A1 | 10/2013 | Liu et al. | |
| 2014/0203217 A1* | 7/2014 | Hwang ................. | H01M 4/364 252/502 |
| 2014/0255785 A1 | 9/2014 | Do et al. | |

(Continued)

OTHER PUBLICATIONS

Zheng et al "Molecular Spring Enabled High-Performance Anode for Lithium Ion Batteries", Polymers 2017, 9, 657. (Year: 2017).*

(Continued)

*Primary Examiner* — Mark Kopec

(74) *Attorney, Agent, or Firm* — Crowell & Moring LLP

(57) ABSTRACT

A composite electrode prepared from silicon-graphene material and conductive polymer binder poly (1-pyrenebutyl methacrylate-co-methacrylic acid) for use in lithium-ion batteries.

20 Claims, 23 Drawing Sheets
(22 of 23 Drawing Sheet(s) Filed in Color)

(56) References Cited

U.S. PATENT DOCUMENTS

| | | |
|---|---|---|
| 2015/0000118 A1 | 1/2015 | Zhao et al. |
| 2015/0028022 A1 | 1/2015 | Moon et al. |
| 2015/0243996 A1* | 8/2015 | Liu .................. H01M 4/622 429/217 |
| 2018/0076458 A1 | 3/2018 | Lux et al. |
| 2018/0076459 A1* | 3/2018 | Lux .................. H01M 4/0404 |

OTHER PUBLICATIONS

Farhangi et al "Characterization of the Long-Range Internal Dynamics of Pyrene-Labeled Macromolecules by Pyrene Excimer Fluorescence", Macromolecules 2016, 49, 9597-9604. (Year: 2016).*

Farhangi et al "Effect of Side-Chain Length on the Polymer Chain Dynamics of Poly(alkyl methacrylate)s in Solution", Macromolecules 2013, 46, 9738-9747. (Year: 2013).*

U.S. Appl. No. 15/260,445, filed Sep. 9, 2016.

Park et al., "Side-chain conducting and phase-separated polymeric binders for high-performance silicon anodes in lithium-ion batteries", Journal of the American Chemical Society, Feb. 3, 2015, 23 pages, American Chemical Society, ACS Publications.

International Search Report (PCT/ISA/210) issued in PCT Application No. PCT/EP2017/071863 dated Nov. 29, 2017 (five (5) pages).

International Search Report (PCT/ISA/210) issued in PCT Application No. PCT/EP2017/071864 dated Nov. 29, 2017 (five (5) pages).

Zhao, H. et al, "Conductive Polymer Binder for High-Tap-Density Nanosilicon Material for Lithium-Ion Battery Negative Electrode Application", NANO Letters, Nov. 24, 2015, vol. 15, No. 12, pp. 7927-7932, XP055425015 (17 pages).

Chen, R. et al, "Noncovalent Sidewall Functionalization of Single-Walled Carbon Nanotubes for Protein Immobilization", Jan. 22, 2001, vol. 123, pp. 3838-3839, (two (2) pages).

* cited by examiner

CONDUCTIVE POLYMER BINDER FOR A NOVEL SILICON/GRAPHENE ANODE IN LITHIUM ION BATTERIES

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

FIELD OF THE INVENTION

The present disclosure relates generally to lithium-ion batteries, and more specifically a lithium-ion battery using silicon-graphene and conductive polymer binder composite electrodes.

BACKGROUND OF THE INVENTION

Lithium ion rechargeable batteries are a prime candidate for a variety of devices, including electric vehicle (EV) and hybrid electric vehicle (HEV) applications, due to their high energy capacity and light weight. All cells are built from a positive electrode (cathode) and a negative electrode (anode), electrically isolated by a thin separator and combined with a liquid transporting medium, the electrolyte. Typically, the anode of a conventional Li-ion cell is a composite electrode including at least one active material, i.e., carbonaceous materials and/or silicon based materials, a conductive additive, and a polymeric binder, the cathode is typically a composite electrode too, with a metal oxide as the active material, a conductive additive, and a polymeric binder, and the electrolyte. Both the anode and the cathode contain active materials into which lithium ions insert and extract. The lithium ions move through an electrolyte from the negative electrode (anode) to the positive electrode (cathode) during discharge, and in reverse, from the positive electrode (cathode) to the negative electrode (anode), during recharge.

Electrode design has been a key aspect in achieving the energy and power density, and life performance required for electric vehicle (EV) batteries. State-of-art lithium-ion electrodes have used a polymer binder to ensure the integrity of the composite electrode for a dimensionally stable laminate. The polymer binder plays a critical function in maintaining mechanical electrode stability and electrical conduction during the lithium insertion and removal process. Typical binders which can be used are starch, carboxymethyl cellulose (CMC), diacetyl cellulose, hydroxypropyl cellulose, ethylene glycol, polyacrylates, poly(acrylic acid), polytetrafluoroethylene, polyimide, polyethylene-oxide, poly(vinylidene fluoride) and rubbers, e.g., ethylene-propylenediene monomer (EPDM) rubber or styrene butadiene rubber (SBR), copolymers thereof, or mixtures thereof. Typically, the anode and the cathode require different binders. For example, styrene-butadiene rubber (SBR) is a binder which is mainly used to prepare the anode electrode. Polyvinylidene difluoride (PVDF) is mainly used to prepare the cathode electrode. In addition, classic electrode materials such as lithium cobalt oxide ($LiCoO_2$) and graphite powder are known to provide dimensional stability during the electrochemical processes. The polymer binder materials such as polyvinylidene difluoride (PVDF) are often used to adhere to electron conducting particles in maintaining the physical contacts for electrical connection within the laminate.

This state-of-the-art approach works fairly well until the introduction of higher-capacity electrode materials such as silicon (Si) in the composite electrode. Silicon (Si) materials have been extensively explored as one of the most promising anode candidates for lithium-ion batteries because of its ability to provide over ten times greater theoretical specific capacities than conventional graphite based anodes. Additionally, because silicon is abundant, it is less costly to use when compared to other alternatives for high energy lithium-ion battery application. However, Si volume change during cycling has created excessive stress and movement in the composite electrode and increased surface reactions. Specifically, electrochemical alloying of Li with Si gave $Li_{4.4}Si$ as the final lithiation state and a capacity of close to 4,200 mAh/g. However, almost 320% volume expansion occurs as the material transitions from Si to the $Li_{4.4}Si$ phase during charging. Because of this high volume change, the electronic integrity of the composite electrode is disrupted, and a strong and continuous surface side reaction is induced, both leading to a fast capacity fading of the battery, and overall decreased battery life.

In order to use Si material, a new method to assemble Si-active material articles must be put in place, along with Si surface stabilization. With the in-depth knowledge of the Si surface properties and increased commercial supply of Si for battery applications, there is an opportunity/demand to investigate better Si assembly and stabilization for electrode application.

Accordingly, it is an object of the present invention to overcome, or at least alleviate, one or more difficulties and deficiencies related to the prior art. These and other objects and features of the present invention will be clear from the following disclosure.

SUMMARY OF THE INVENTION

The present invention combines a silicon-graphene material and a conductive polymer binder to formulate a composite electrode for use in lithium-ion batteries. The conductive polymer binder is designed to enable the stable cycling of the silicon-graphene anode material.

In one embodiment of the invention, a composite electrode is provided including a silicon-graphene active material with a specific capacity between 500 and 3500 mAh/g and a conductive polymer binder having a polymeric composition with repeating units of the formula:

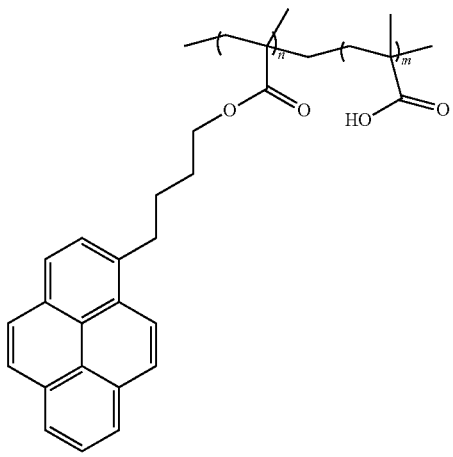

where n+m is between 10 and up to 10 million; and n/m ratio is 9/1 to 1/9. In another embodiment of the invention, a composite electrode is provided including a silicon-graphene active material with a specific capacity between 500 and 3500 mAh/g and a conductive polymer binder that is poly (1-pyrenebutyl methacrylate) having the following formula:

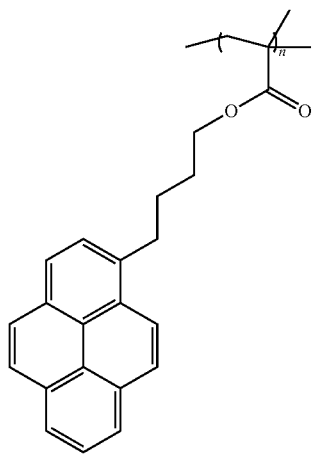

where n is between 10 and up to 10 million.

In yet another embodiment of the invention, a method for making the composite electrode of the present invention is provided.

Other objects, advantages and novel features of the present invention will become apparent from the following detailed description of one or more preferred embodiments when considered in conjunction with the accompanying drawings. The disclosure is written for those skilled in the art. Although the disclosure uses terminology and acronyms that may not be familiar to the layperson, those skilled in the art will be familiar with the terminology and acronyms used herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figures 1A, 1B:
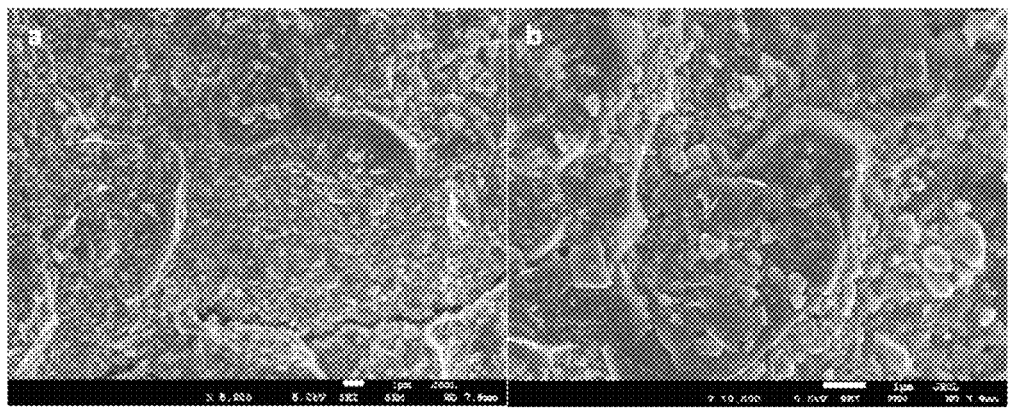
FIG. 1A shows an SEM image of an electrode laminate composed of 10% PBuPy, 80% composite active material containing 48% Si and 52% carbon, and 10% graphene according to an embodiment of the present invention.
FIG. 1B shows another SEM image of an electrode laminate composed of 10% PBuPy, 80% composite active material containing 48% Si and 52% carbon, and 10% graphene according to an embodiment of the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

As used herein, "active material" means that portion of the electrode that stores lithium ions. In the case of the cathode, the active material can be a compound such as a lithium metal oxide complex. In the case of the counter, anode electrode, the active material can be silicon or lithiated silicon, or a carbonaceous material.

As used herein, "CC" stands for constant current, which is a simple form of charging batteries, with the current level set at approximately 10% of the maximum battery rating. "CV" stands for constant voltage, which allows the full current of the charger to flow into the battery until the power supply reaches its pre-set voltage. The current will then taper down to a minimum value once that voltage level is reached. "CCCV" stands for constant current/constant voltage, which is a combination of the above two methods. The charger limits the amount of current to a pre-set level until the battery reaches a pre-set voltage level. The current then reduces as the battery becomes fully charged.

Recently, as described in U.S. Pat. No. 9,153,353, a new approach has been developed to use electrically conductive polymer binder to connect and stabilize Si composite electrode. The conductive polymers developed in U.S. Pat. No. 9,153,353 act as a binder for the silicon particles used for the construction of negative anode. They are mixed with silicon nano-sized silicon particles in a slurry process, then coated on a substrate such as copper or aluminum and thereafter allowed to dry to form the film electrode. These conductive polymer binders have opened a new paradigm of electrode design for Si materials: they provide molecular-level electrical interactions between the electrode matrix and the active materials and accommodate volume expansion of high capacity Si materials. The cycling stability of the silicon electrode is significantly enhanced by this approach. Moreover being conductive itself, the use of conductive polymer binder eliminates the necessity of conductive additive or greatly reduces the conductive additive amount necessary; this considerably increases the loading of the active material.

Our previous work established that the pyrene-based methacrylate polymer as an effective polymer binder for pure Si anode (See U.S. Pat. No. 9,153,353; and Park et al., J. Am. Chem. Soc., 2015, 137, 2565-2571). The pyrene side chain furnishes the conductive nature to the polymer while allowing flexible fine-tune of the polymer structure. For example, as previously described in U.S. patent application Ser. No. 15/260,445, methacrylic acid (MAA) is incorporated into a 1-pyrenemethyl methacrylate (PPy) via polymerization providing a conductive co-polymer, poly (1-pyrenemethyl methacrylate-co-methacrylic acid) (PPy-MAA). The methacrylic acid (MAA) adds carboxylic acid functionalities into the polymer binder to enhance the adhesion of the binder on the active material.

We have newly discovered that poly (1-pyrenebutyl methacrylate) (PBuPy) and co-polymer, poly (1-pyrenebutyl methacrylate-co-methacrylic acid) (PBuPy-MAA) can be used as effective conductive binders for silicon-graphene and in general silicon anodes. Silicon-graphene anodes are typically synthesized from silicon nanoparticles combined with graphene sheets, a morphology which helps to maintain the electrical integrity of the electrode during the drastic volume changes during cell cycling. We found that both the conductive moiety (PBuPy) and the adhesion moiety (MAA) are indispensable to enable the stable cycling of silicon-graphene anode materials.

Depicted below are the synthetic schemes for making poly (1-pyrenebutyl methacrylate) (PBuPy) and co-polymer, poly (1-pyrenebutyl methacrylate-co-methyacrylic acid) (PBuPy-MAA):

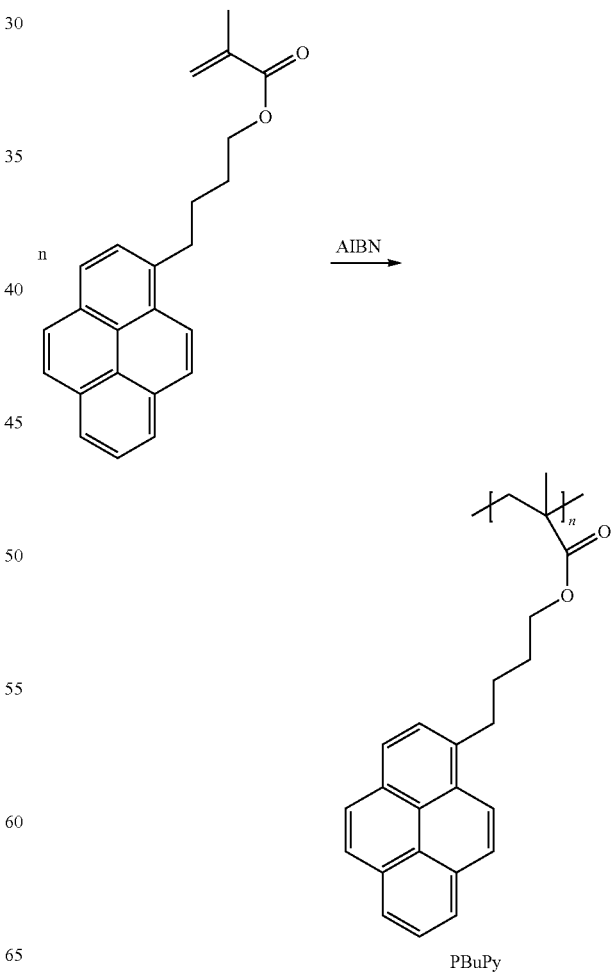

PBuPy

-continued

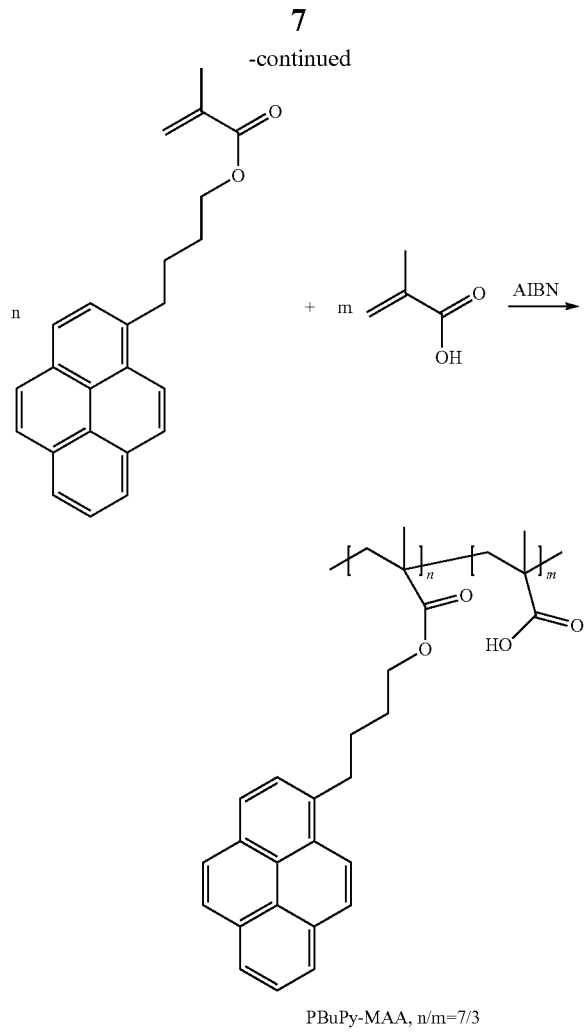

PBuPy-MAA, n/m=7/3

In one embodiment, a composite electrode for use in a lithium-ion battery is provided, which includes a silicon-graphene active material with a specific capacity between 500 and 3500 mAh/g and a conductive polymer binder having a polymeric composition with repeating units of the formula:

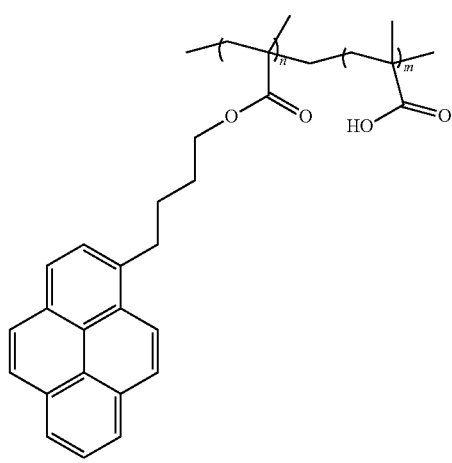

where n+m is between 10 and up to 10 million, and n/m ratio is 9/1 to 1/9. Preferably, the n/m ratio is 7/3. The conductive polymer binder is a copolymer of 1-pyrenebutyl methacrylate and methacrylic acid (PBuPy-MAA). Preferably, the methacrylic acid present in the copolymer is in an amount from about 30 to 78 mol %, and the 1-pyrenebutyl methacrylate present in the copolymer is in an amount from about 22 to 70 mol %. Preferably, the methacrylic acid present in the copolymer is in an amount from about 10 to 51 wt %, and the 1-pyrenebutyl methacrylate present in the copolymer is in an amount from about 49 to 90 wt %. The electrode is composed of PBuPy-MAA binder in the amount of about 1 to 20 wt % and silicon-graphene active material in an amount of about 80 to 99 wt %. The silicon-graphene active material contains about 10 to 99 wt % of Si and about 1 to 90 wt % of C. In some embodiments, a graphene additive is added to the electrode. In other embodiments, for example, the electrode is comprised of about 5 to 20 wt % of polymer binder, about 65 to 94 wt % of silicon-graphene active material and about 1 to 15 wt % of graphene additive.

In another embodiment, a composite electrode for use in a lithium-ion battery is provided, which includes a silicon-graphene active material with a specific capacity between 500 and 3500 mAh/g and a conductive polymer binder that is poly (1-pyrenebutyl methacrylate) having the following formula:

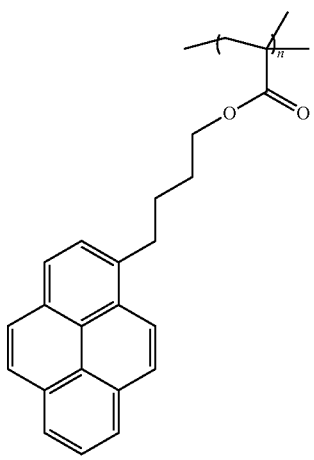

where n is between 10 and 10 million. The electrode is composed of PBuPy binder in the amount of about 1 to 20 wt % and silicon-graphene active material in an amount of about 80 to 99 wt %. The silicon-graphene active material contains about 10 to 99 wt % of Si and about 1 to 90 wt % of C. A graphene additive can also be added to this electrode. In one embodiment, this electrode described herein is comprised of about 5 to 20 wt % of polymer binder, about 65 to 94 wt % of silicon-graphene active material and about 1 to 15 wt % of graphene additive.

In another embodiment, a method for making a composite electrode for use in a lithium ion battery is provided. The method includes the steps of: forming a solution of a solvent and a conductive polymer binder; adding a silicon-graphene active material to the solution to form a slurry; mixing the slurry to form a homogeneous mixture; depositing a thin film of the thus obtained mixture over top of a substrate; and drying the resulting composite to form the electrode. The conductive polymer binder has a polymeric composition with repeating units of the formula:

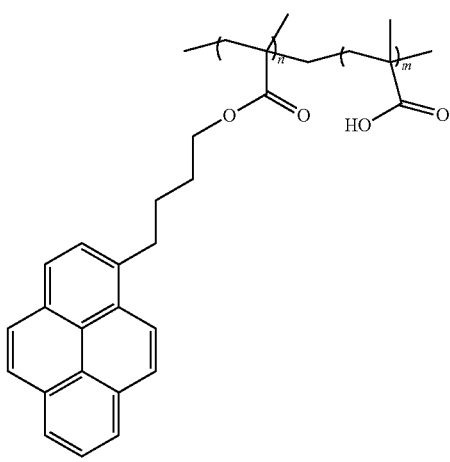

where n+m is between 10 and up to 10 million, and n/m ratio is 9/1 to 1/9. Preferably, the n/m ratio is 7/3. Any aprotic solvents can be used in the method of making the composite electrode. The solvent is used to dissolve a polymer, makes a slurry and fabricate the lithium ion electrode. Typical aprotic solvents used are N-methyl-2-pyrrolidone (NMP), N-ethyl-2-pyrrolidone (NEP), toluene and chlorobenzene. Typically, in drying the resulting composite to form the electrode, the temperature and the time selected for drying are set based on the active material and the composition of the electrode, the slurry solvent and the target electrode thickness. In some embodiments, the conductive polymer binder described herein is a copolymer of 1-pyrenebutyl methacrylate and methacrylic acid (PBuPy-MAA). In other embodiments, the conductive polymer binder is poly (1-pyrenebutyl methacrylate) (PBuPy) having the following formula:

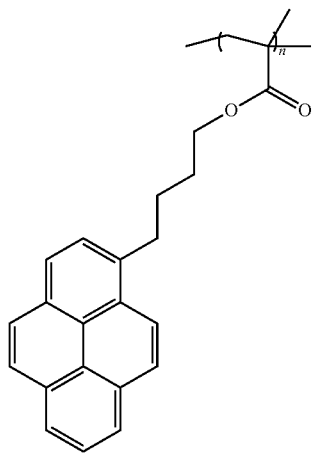

where n is between 10 and 10 million.

In order to show the effects of the acid functionality (MAA moiety) in the PBuPy-MAA copolymer on the electrochemical performance of the graphene/Si anode, both PBuPy homopolymer and PBuPy-MAA copolymer (at 70%: 30% mol ratio) were synthesized and incorporated into high loading anode construction. For example, an electrode laminate made of 10% binder, 80% Si/graphene composite active anode material composed of 48% Si and 52% carbon (Gen 1.5, obtained from XG Sciences) and 10% graphene nanoplatelets (xGnP®-R-10 obtained from XG Sciences) were first mixed to form a N-methyl pyrrolidone (NMP)-based slurry. The laminate was then air dried for 6 hours and vacuum-dried at 130° C. overnight before assembling CR 2325-type coin cell for cell testing. Half cells were prepared using lithium metal (obtained from FMC Corporation) as the counter electrode, using electrolyte 70% EC/DEC (3/7), 30% FEC, 1.2 M $LiPF_6$ (purchased from BASF). All cells were then tested with a cut-off voltage of 0.01 V-1V at C/10 (100 mA/g).

Figures 1C, 1D:
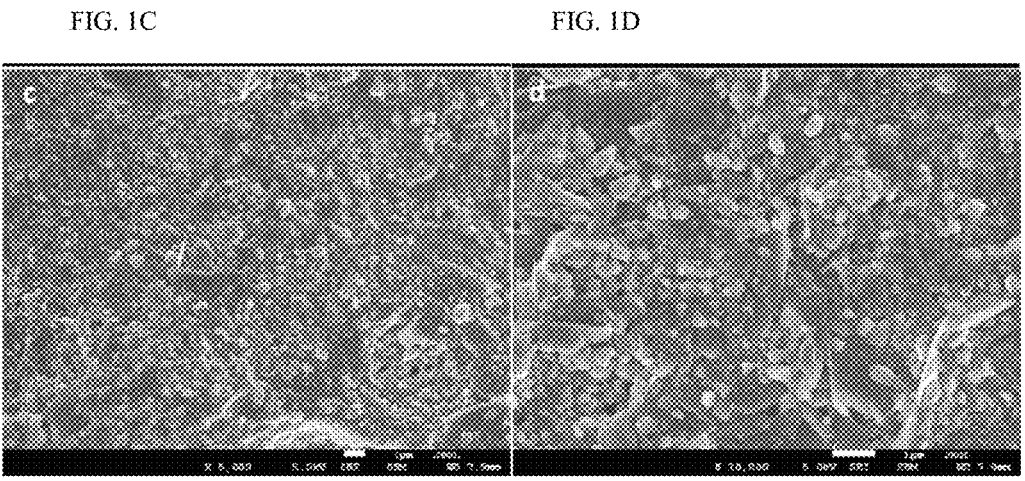
FIG. 1C shows an SEM image of an electrode laminate composed of 10% PBuPy-MAA, 80% composite active material containing 48% Si and 52% carbon, and 10% graphene according to an embodiment of the present invention.
FIG. 1D shows another SEM image of an electrode laminate composed of 10% PBuPy-MAA, 80, composite active material containing 48% Si and 52% carbon, and 10% graphene according to an embodiment of the present invention.

FIG. 1 shows the Scanning Electron Microscope (SEM) images of the two polymer binders, the PBuPy homopolymer and the PBuPy-MAA copolymer. The electrode morphologies of laminates composed of 10% PBuPy, 80% Si/graphene composite active anode material composed of 48% Si and 52% carbon (Gen 1.5) and 10% graphene were characterized by SEM and shown in FIGS. 1A and 1B. The electrode morphologies of laminates composed of 10% PBuPy-MAA, 80% Si/graphene composite active anode materials composed of 48% Si and 52% carbon (Gen 1.5) and 10% graphene were characterized by SEM and shown in FIGS. 1C and 1D. Based on these SEM images, it has shown that with both polymer binders, the PBuPy homopolymer and the PBuPy-MAA copolymer, which incorporated laminates, gave tightly packed surface morphology. These SEM images present a homogeneous dispersion of graphene conductive agent and active material particles, indicating that the use of these binders is appropriate for slurry and lamination preparation processes to ensure a uniform distribution.

Figure 2A:
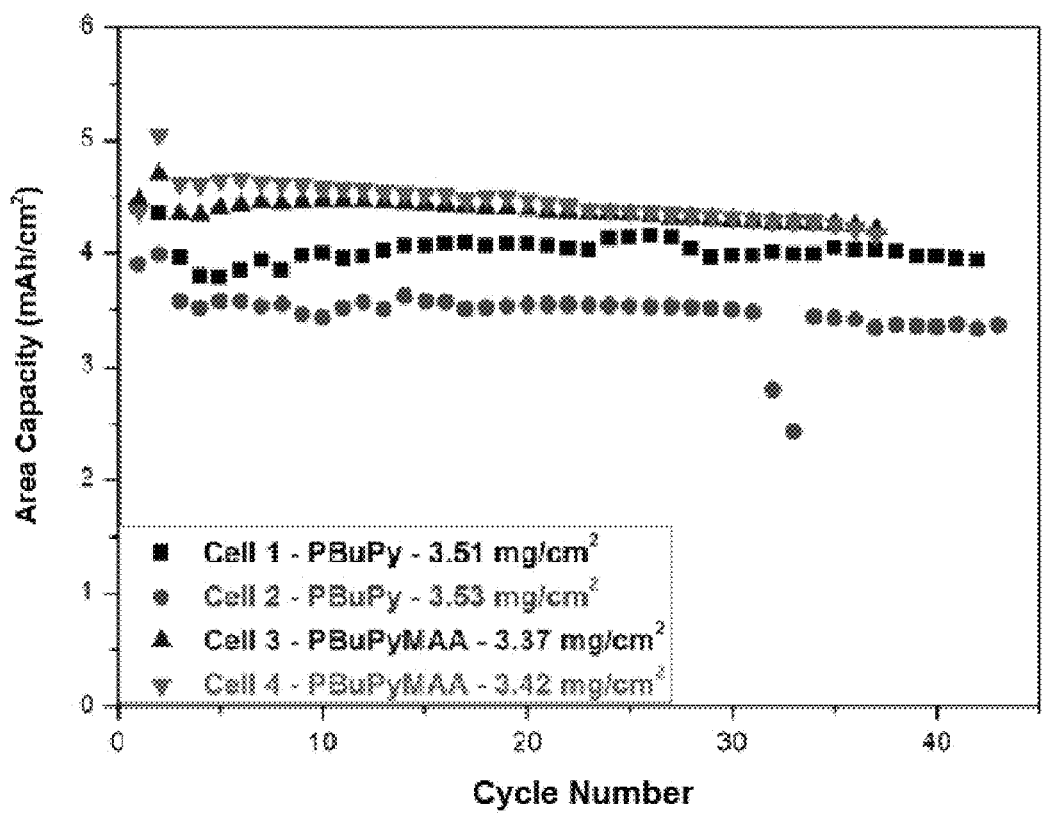
FIG. 2A illustrates the cycling performance at C/10 (running with CC) of both PBuPy and PBuPy-MAA in high-loading anode as area capacity (mAh/cm$^2$) vs. cycle number.
Figure 2B:
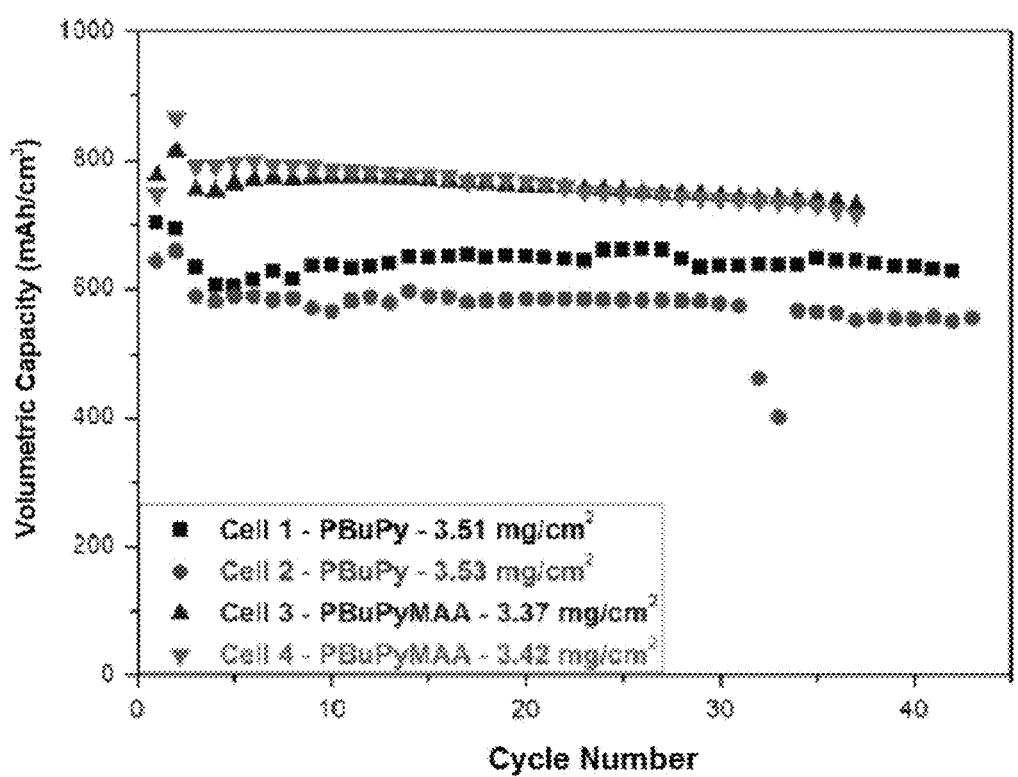
FIG. 2B illustrates the cycling performance at C/10 (running with CC) of both PBuPy and PBuPy-MAA in high-loading anode as volumetric capacity (mAh/cm$^3$) vs. cycle number.
Figure 2C:
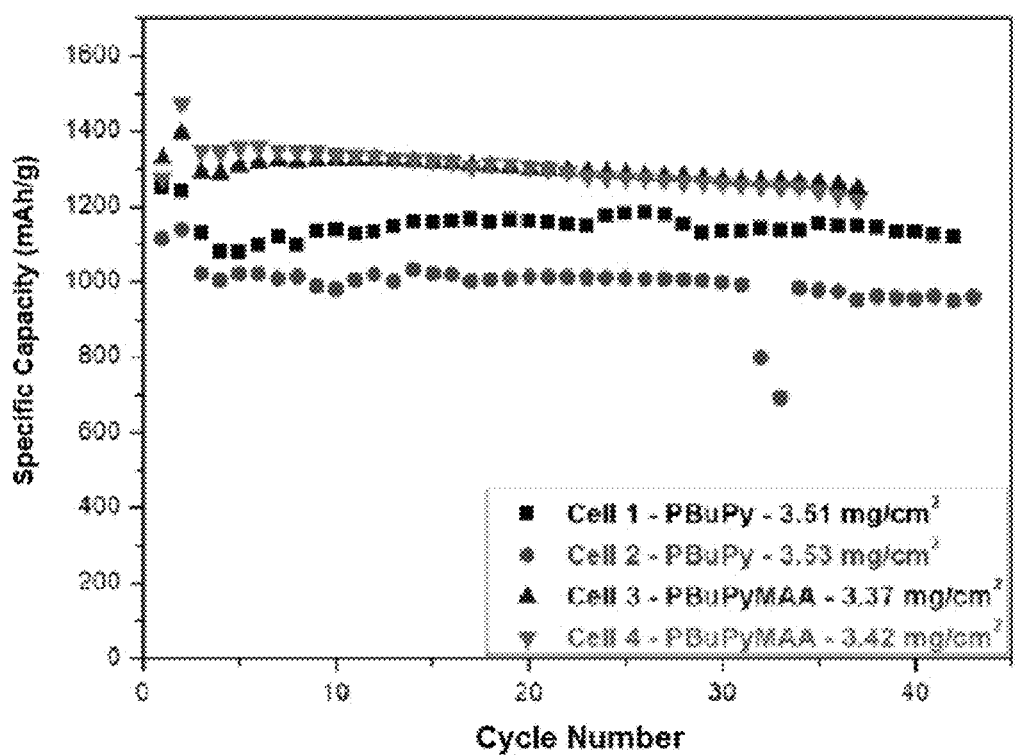
FIG. 2C illustrates the cycling performance at C/10 (running with CC) of both PBuPy and PBuPy-MAA in high-loading anode as gravimetric specific capacity (mAh/g) vs. cycle number.
Figure 2D:
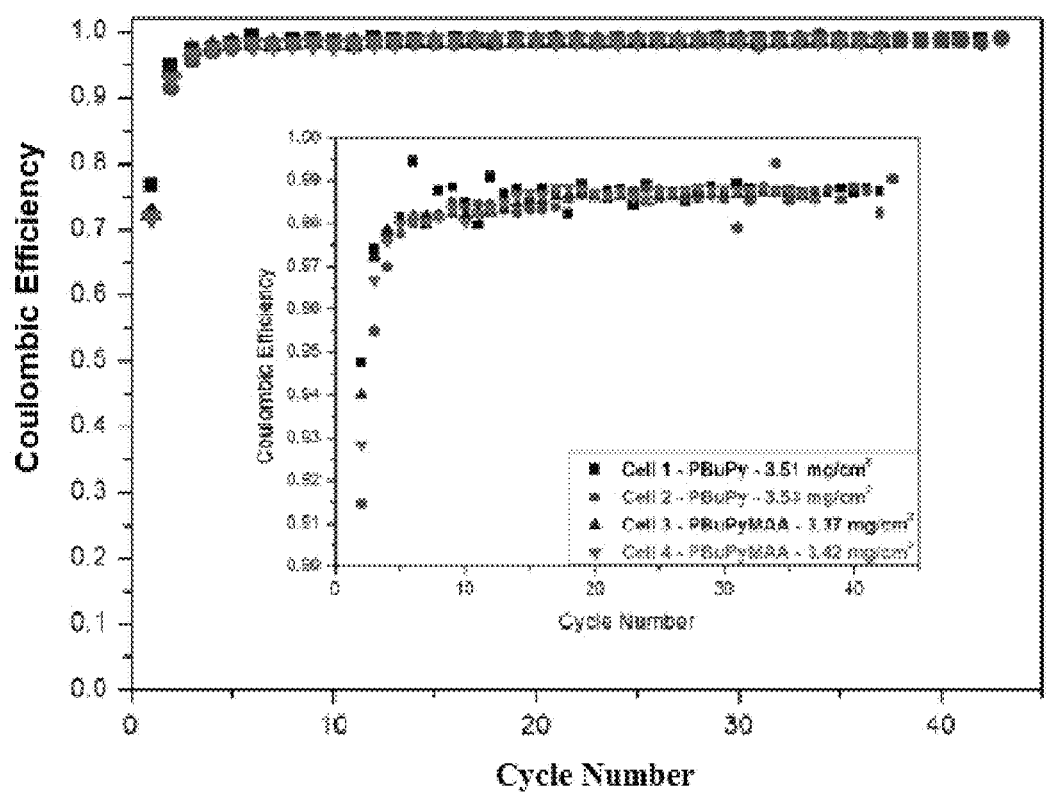
FIG. 2D illustrates the cycling performance at C/10 (running with CC) of both PBuPy and PBuPy-MAA in high-loading anode as coulombic efficiency vs. cycle number. (1C=1000 mA/g).

FIG. 2 illustrates the cycling performance at C/10 running with CC of both polymer binders, PBuPy and PBuPy-MAA, in high-loading anode as area capacity ($mAh/cm^2$) vs. cycle number (in FIG. 2A), volumetric capacity ($mAh/cm^3$) vs. cycle number (in FIG. 2B), gravimetric specific capacity (mAh/g) vs. cycle number (in FIG. 2C), and coulombic efficiency vs. cycle number (in FIG. 2D). Both $1^{st}$ cycle efficiencies of PBuPy and PBuPy-MAA are generally higher than the cells with PPy-MAA conductive polymer binder under the same fabrication and testing conditions. The loss of irreversible capacity loss could stem from the improved flexibility of PBuPy and PBuPy-MAA polymer backbone, where adhesion is facilitated by the addition of butyl group in between "hard" pyrene functional group and rigid polymer backbone. Both compositions exhibit uniform cycling trend and tight distribution indicating the highly reproducible electrodes, among which, cell 3 and 4 (associated with PBuPy-MAA) give remarkable cycling performance. As FIG. 2 shows, the cells were stabilized right after formation cycle and reach an area capacity above 4 $mAh/cm^2$ and a volumetric capacity around 800 $mAh/cm^3$. These excellent test results were all associated with using PBuPy-MAA.

To evaluate these two conductive polymers as high energy density electrode binder materials, cycling tests at a cycling rate of C/3 were conducted. In this task, three sequence test methods were applied: CC at a cycling rate of C/3, CCCV at a cycling rate of C/3 (cut-off at 0.02 C), and CCCV at a cycling rate of C/3 (cut-off at 1 hour). The results are shown at FIG. 3, FIG. 4, and FIG. 5, respectively.

Figure 3A:
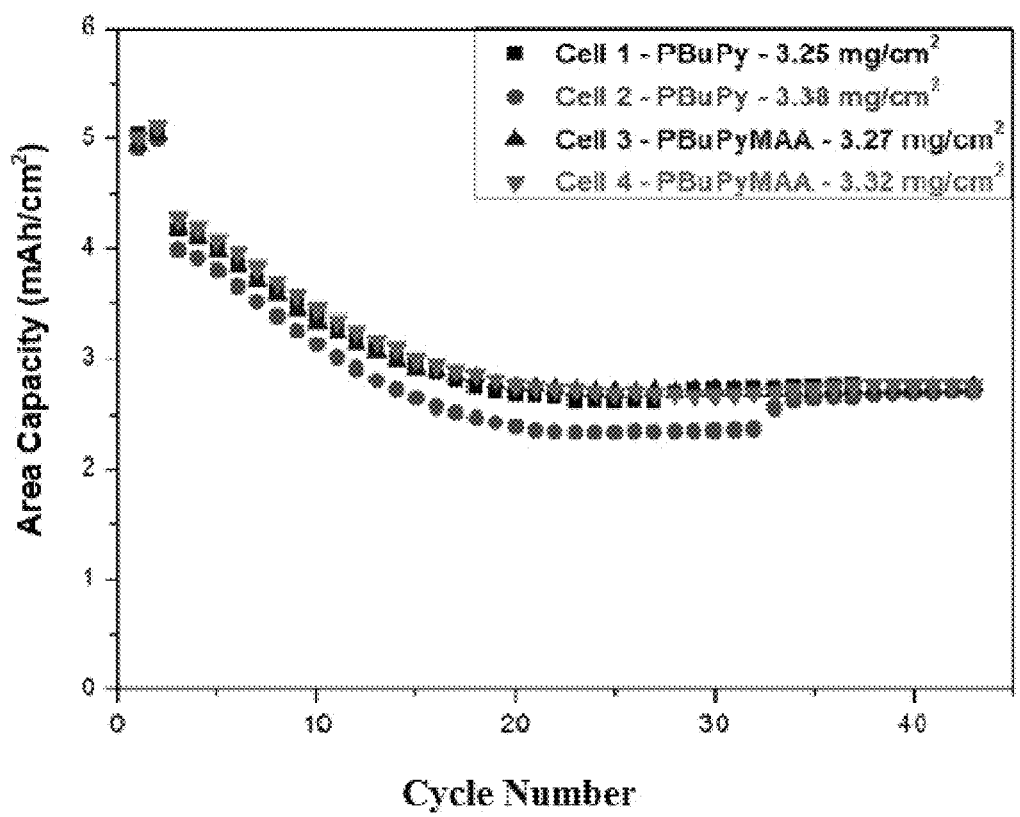
FIG. 3A illustrates the cycling performance at C/3 (running with CC) of both PBuPy and PBuPy-MAA in high-loading anode as area capacity (mAh/cm$^2$) vs. cycle number.
Figure 3B:
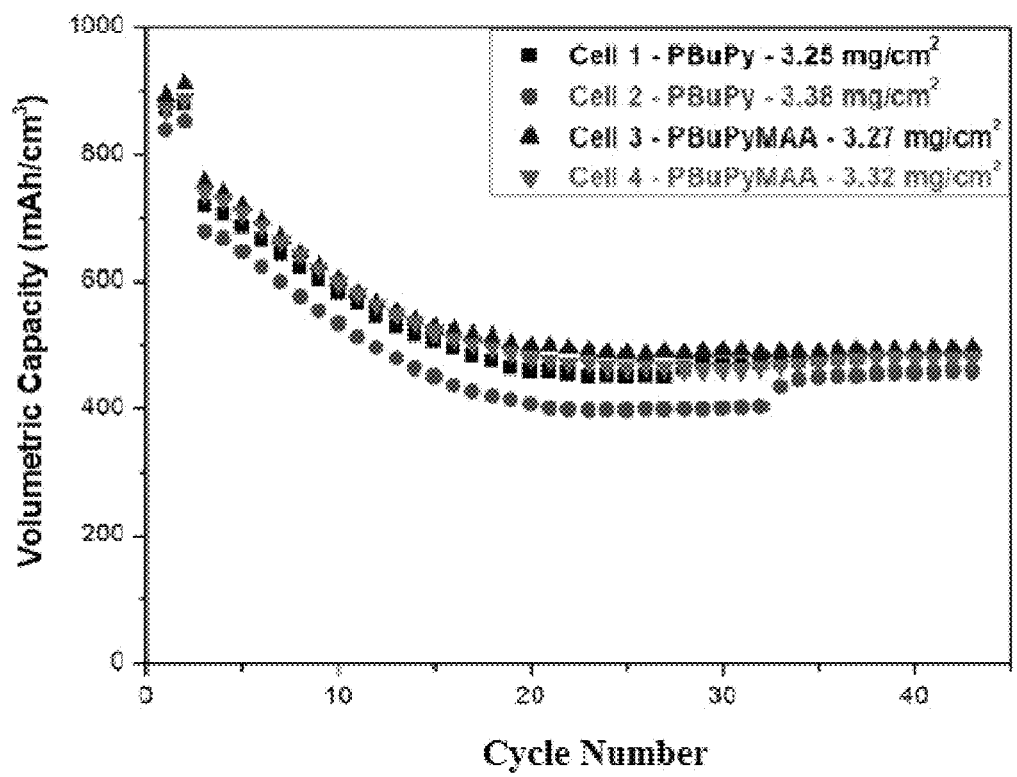
FIG. 3B illustrates the cycling performance at C/3 (running with CC) of both PBuPy and PBuPy-MAA in high-loading anode as volumetric capacity (mAh/cm$^3$) vs. cycle number.
Figure 3C:
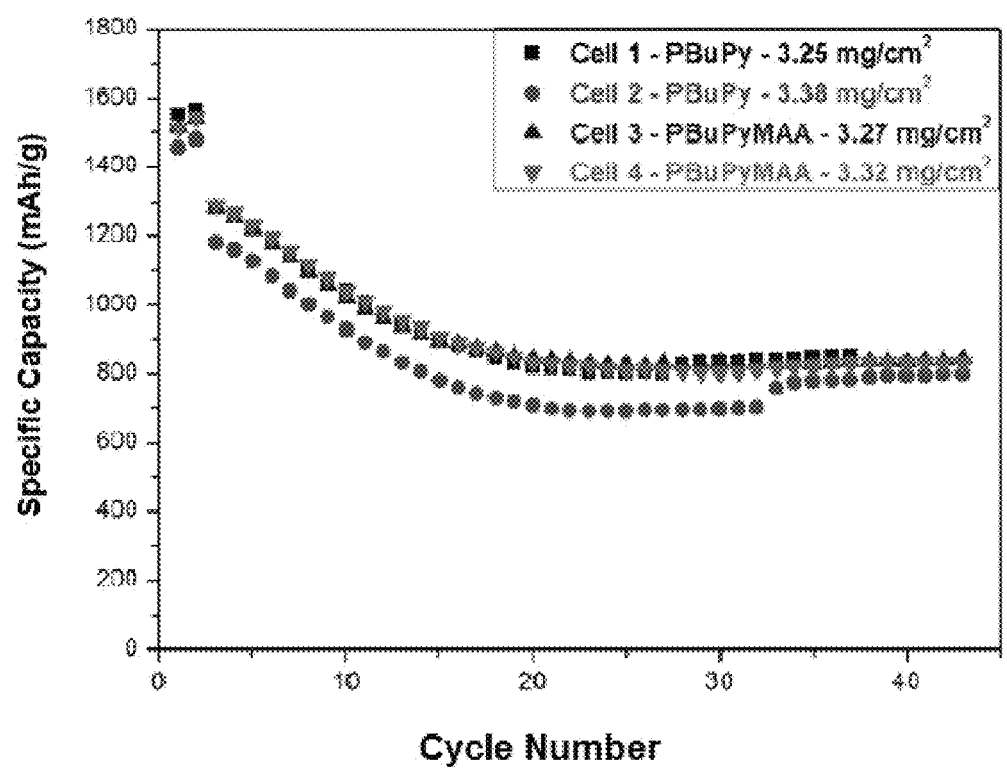
FIG. 3C illustrates the cycling performance at C/3 (running with CC) of both PBuPy and PBuPy-MAA in high-loading anode as gravimetric specific capacity (mAh/g) vs. cycle number.
Figure 3D:
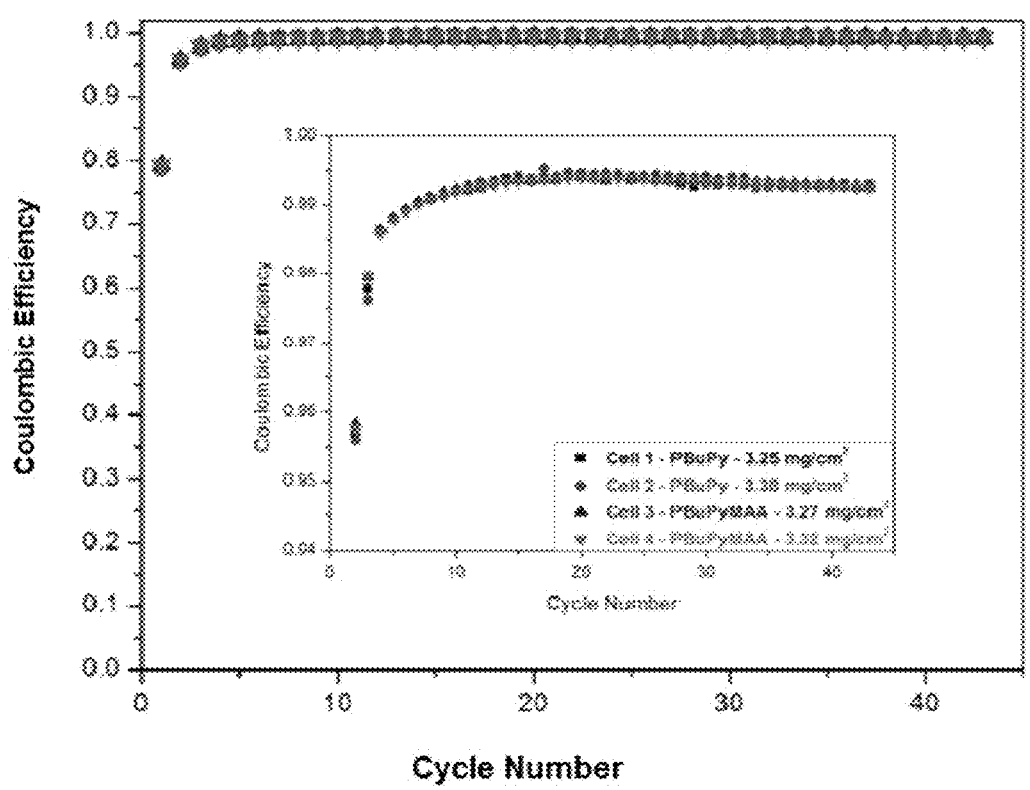
FIG. 3D illustrates the cycling performance at C/3 (running with CC) of both PBuPy and PBuPy-MAA in high-loading anode as coulombic efficiency vs. cycle number. (1C=1000 mA/g).

For example, FIG. 3 illustrates the cycling performance at C/3 running with CC of both polymer binders, PBuPy and PBuPy-MAA, in high-loading anode as area capacity ($mAh/cm^2$) vs. cycle number (in FIG. 3A), volumetric capacity ($mAh/cm^3$) vs. cycle number (in FIG. 3B), gravimetric specific capacity (mAh/g) vs. cycle number (in FIG. 3C), and coulombic efficiency vs. cycle number (in FIG. 3D). FIG. 4 illustrates the cycling performance at C/3 (running with CCCV at each step, cut off at C/50) of both polymer binders, PBuPy and PBuPy-MAA, in high-loading anode as area capacity (mAh/cm$^2$) vs. cycle number (in FIG. 4A), volumetric capacity (mAh/cm$^3$) vs. cycle number (in FIG. 4B), gravimetric specific capacity (mAh/g) vs. cycle number (in FIG. 4C), coulombic efficiency vs. cycle number (in FIG. 4D), voltage (V) vs. capacity (mAh) in the 3$^{rd}$ cycle (in FIG. 4E), and voltage (V) vs. time (h) in the 3$^{rd}$ cycle (in FIG. 4F). FIG. 5 illustrates the cycling performance at C/3 (running with CCCV at each step, cut off at 1 hour) of both polymer binders, PBuPy and PBuPy-MAA, in high-loading anode as area capacity (mAh/cm$^2$) vs. cycle number (in FIG. 5A), volumetric capacity (mAh/cm$^3$) vs. cycle number (in FIG. 5B), gravimetric specific capacity (mAh/g) vs. cycle number (in FIG. 5C), and coulombic efficiency vs. cycle number (in FIG. 5D).

Figure 4A:
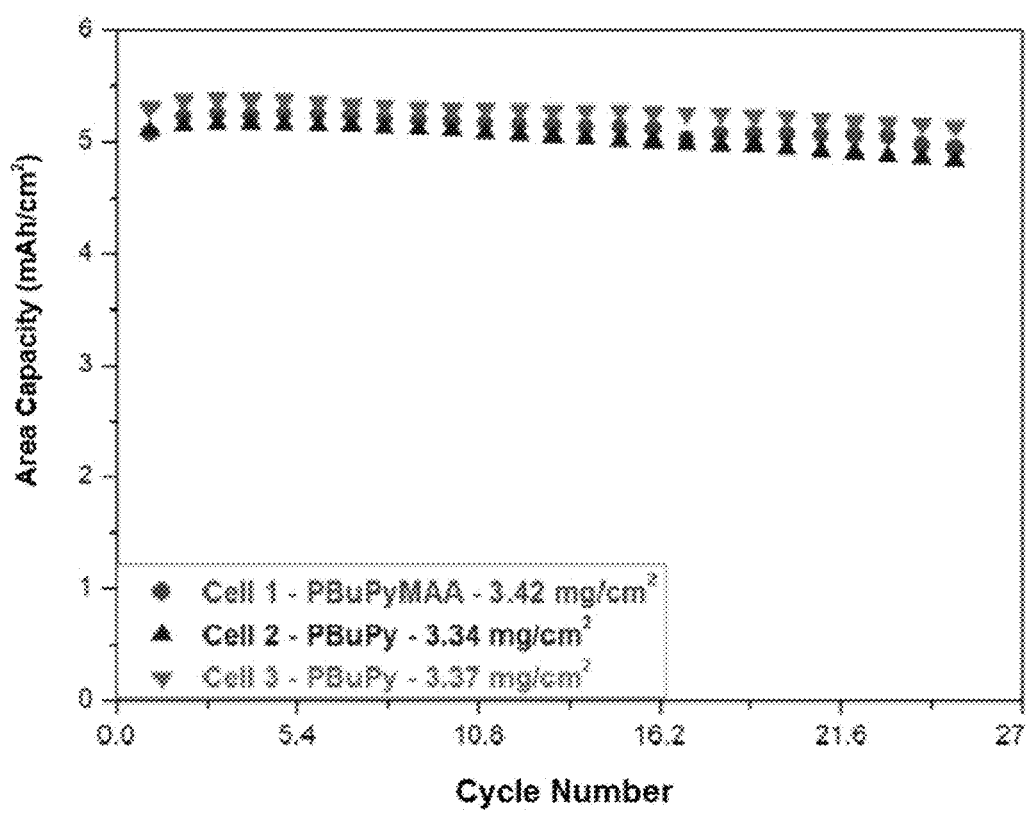
FIG. 4A illustrates the cycling performance at C/3 (running with CCCV in each step, cut-off at C/50) of both PBuPy and PBuPy-MAA in high-loading anode as area capacity (mAh/cm$^2$) vs. cycle number.
Figure 4B:
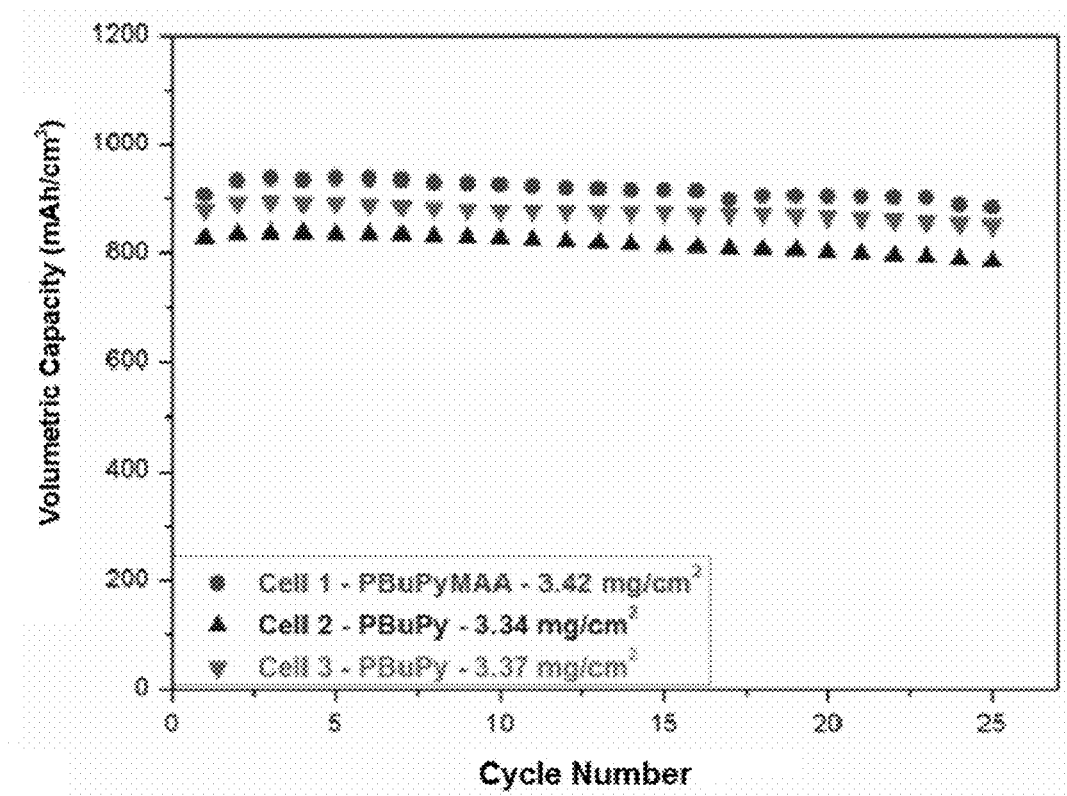
FIG. 4B illustrates the cycling performance at C/3 (running with CCCV in each step, cut-off at C/50) of both PBuPy and PBuPy-MAA in high-loading anode as volumetric capacity (mAh/cm$^3$) vs. cycle number.
Figure 4C:
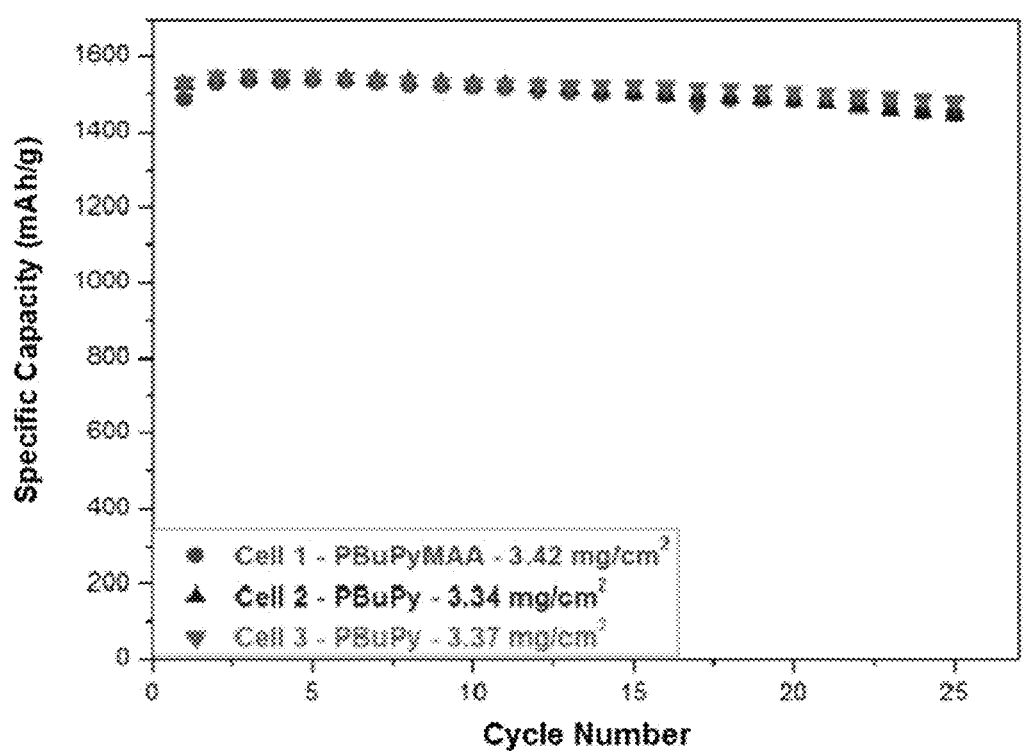
FIG. 4C illustrates the cycling performance at C/3 (running with CCCV in each step, cut-off at C/50) of both PBuPy and PBuPy-MAA in high-loading anode as gravimetric specific capacity (mAh/g) vs. cycle number.
Figure 4D:
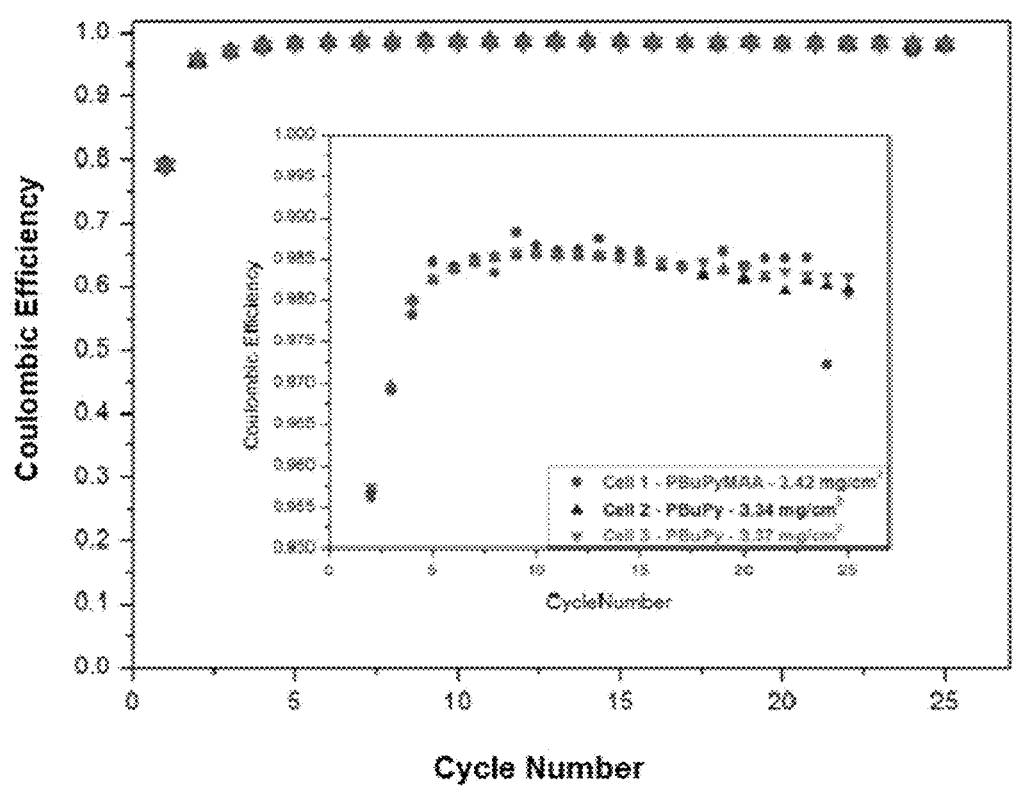
FIG. 4D illustrates the cycling performance at C/3 (running with CCCV in each step, cut-off at C/50) of both PBuPy and PBuPy-MAA in high-loading anode as coulombic efficiency vs. cycle number. (1C=1000 mA/g).
Figure 4E:
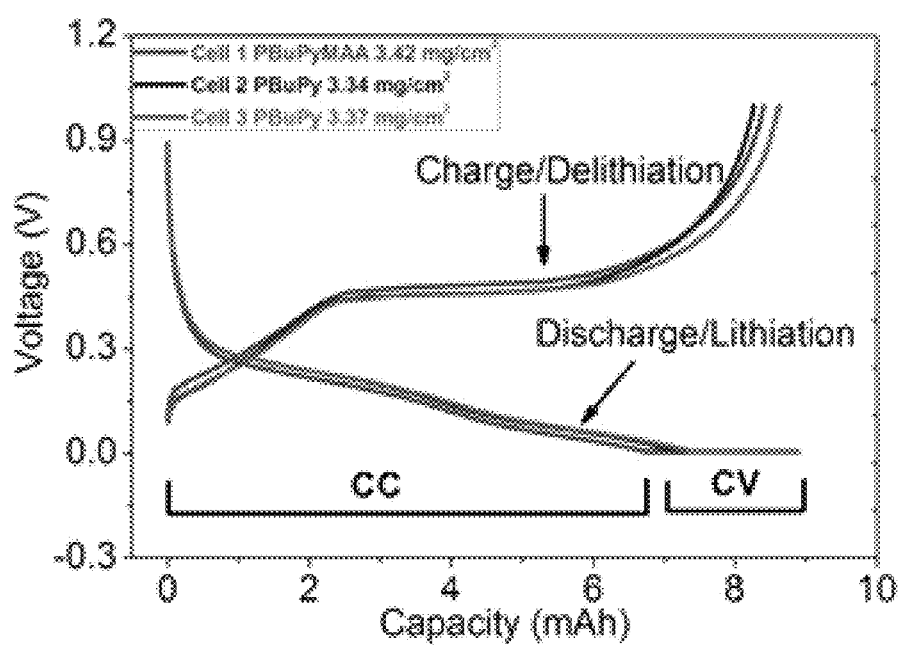
FIG. 4E illustrates the cycling performance at C/3 (running with CCCV in each step, cut-off at C/50) of both PBuPy and PBuPy-MAA in high-loading anode as voltage (V) vs. capacity (mAh) in the 3$^{rd}$ cycle.
Figure 4F:
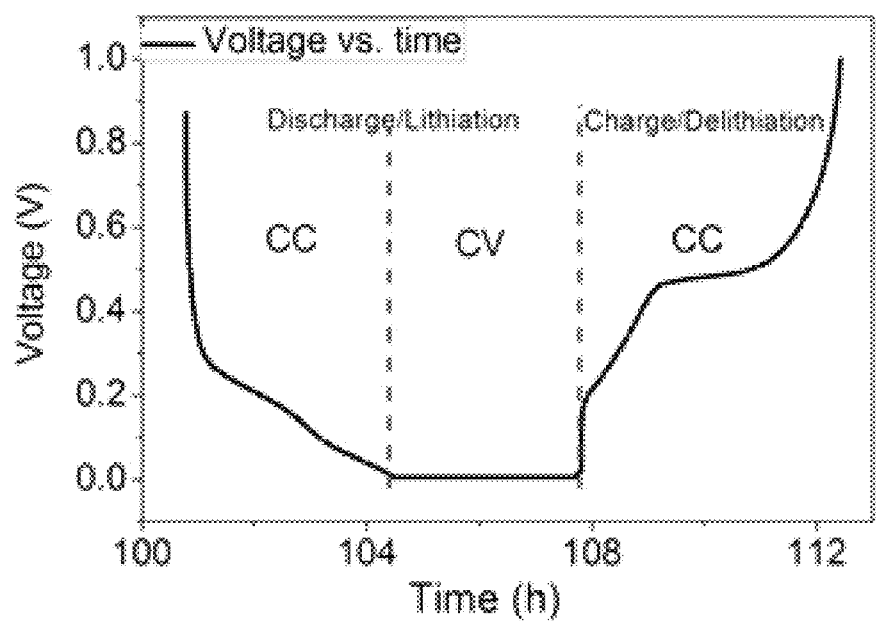
FIG. 4F illustrates the cycling performance at C/3 (running with CCCV in each step, cut-off at C/50) of both PBuPy and PBuPy-MAA in high-loading anode as voltage (V) vs. time (h) in the 3$^{rd}$ cycle.

Based on the results from FIG. 3A-C (in which four cells were prepared using different polymer binders (PBuPy or PBuPy-MAA) and compositions (mass loading) and were tested at a cycling rate of C/3 running with CC), all of the compositions showed initial capacity loss and fast decay within the first 20 cycles, giving above 2.5 mAh/cm$^2$ in area capacity and retaining 60% capacity after reaching plateau. FIG. 3D shows the coulombic efficiency of all four cells underlining the fast decay for the first 20 cycles, before reaching an average capacity retention plateau. The different binder types (PBuPy or PBuPy-MAA) used do not show any obvious difference in their electrochemical performance/behavior. However, when running with CCCV at C/3 (cut-off at 0.02 C) after the first two formation cycles, the cells were showing significantly improved stability (see FIG. 4A-C in which three cells with different compositions (mass loading) were fabricated and tested, giving very similar behavior and tight distribution). In all of these cells, the cycling performances exhibit flat lines with negligible irreversible capacity loss up to 25 cycles. As suggested in the voltage vs. capacity diagram (see FIGS. 4E and 4F), CV step constituted over 3 hours at the 3$^{rd}$ discharge cycle (first 2 cycles are formation cycles), contributing around 20% discharge capacity (lithiation). All cells show remarkable cycling performance under the CCCV procedure. All cells exhibit an area capacity reaching 5 mAh/cm$^2$ and a volumetric capacity above 800 mAh/cm$^3$ at C3, exceeding the performance of commercial graphite electrode by 50%. FIG. 4D shows the columbic efficiency of all three cells underlining the fast decay for the first 20 cycles, before reaching an average capacity retention plateau. The different binder types used (PBuPy or PBuPy-MAA) do not show any obvious difference in their electrochemical performance/behavior.

Figure 5A:
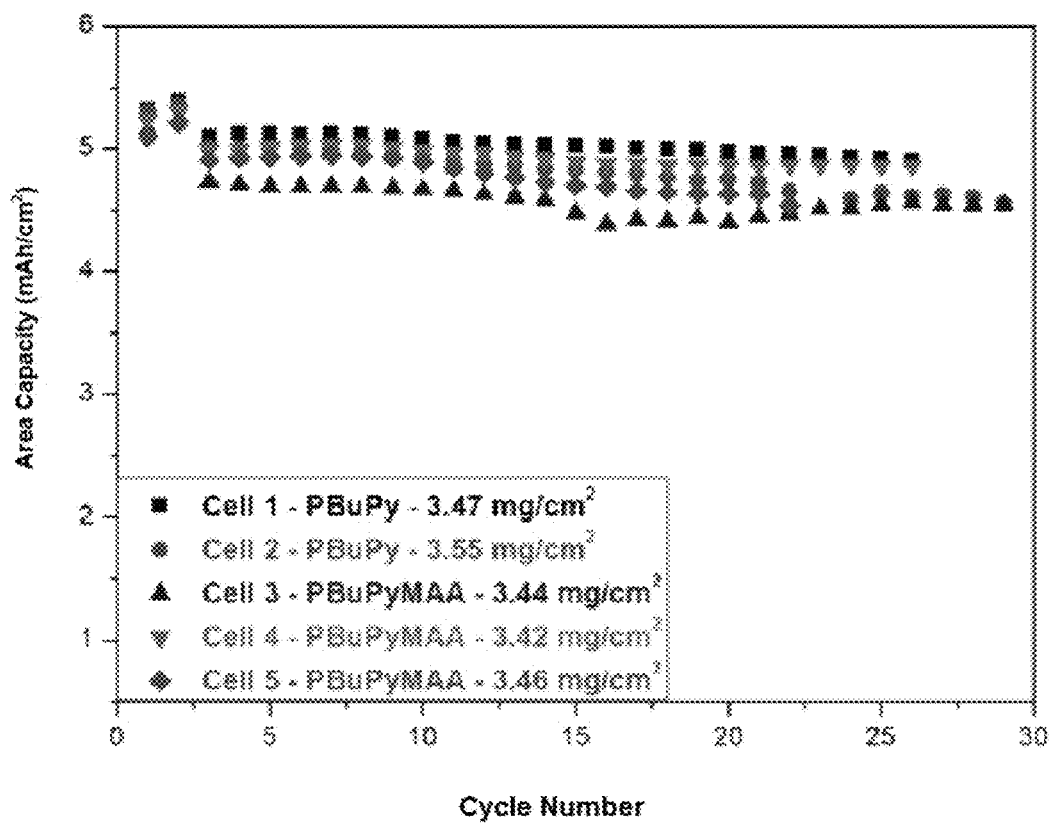
FIG. 5A illustrates the cycling performance at C/3 (running with CCCV in each step, cut-off at 1 hour) of both PBuPy and PBuPy-MAA in high-loading anode as area capacity (mAh/cm$^2$) vs. cycle number.
Figure 5B:
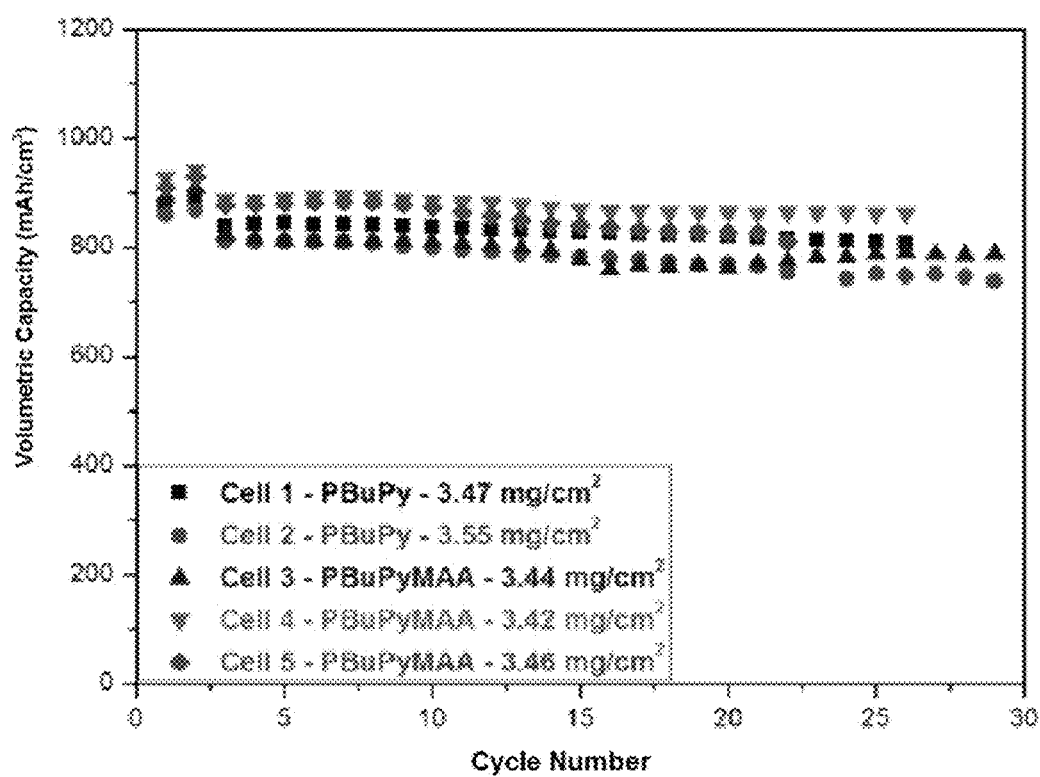
FIG. 5B illustrates the cycling performance at C/3 (running with CCCV in each step, cut-off at 1 hour) of both PBuPy and PBuPy-MAA in high-loading anode as volumetric capacity (mAh/cm$^3$) vs. cycle number.
Figure 5C:
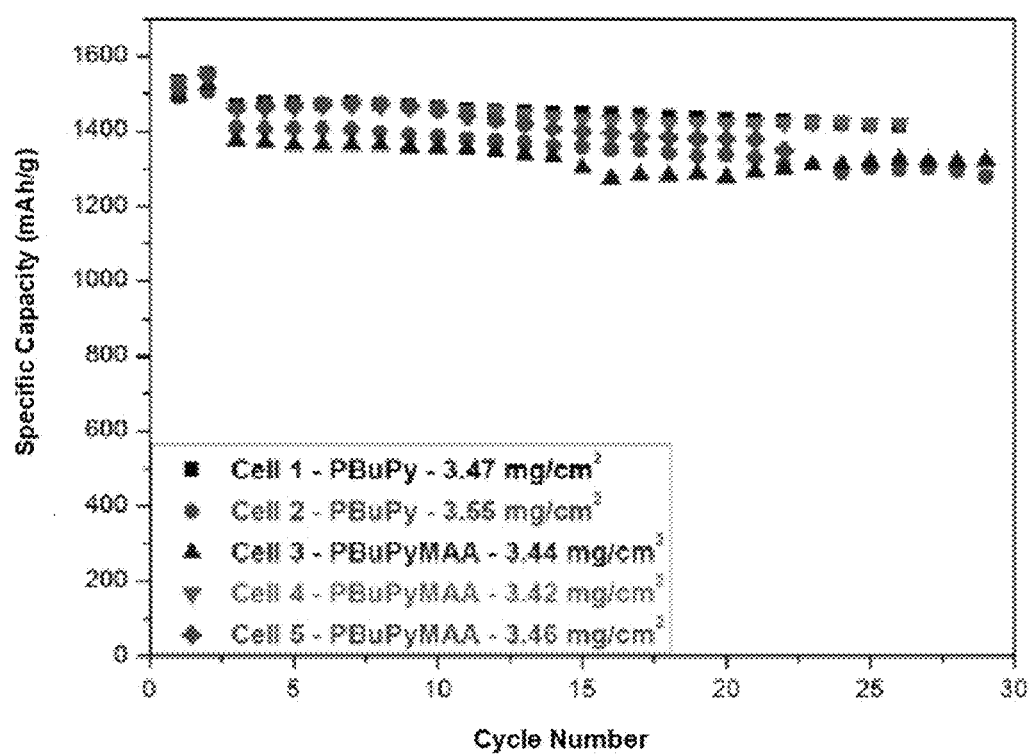
FIG. 5C illustrates the cycling performance at C/3 (running with CCCV in each step, cut-off at 1 hour) of both PBuPy and PBuPy-MAA in high-loading anode as gravimetric specific capacity (mAh/g) vs. cycle number.
Figure 5D:
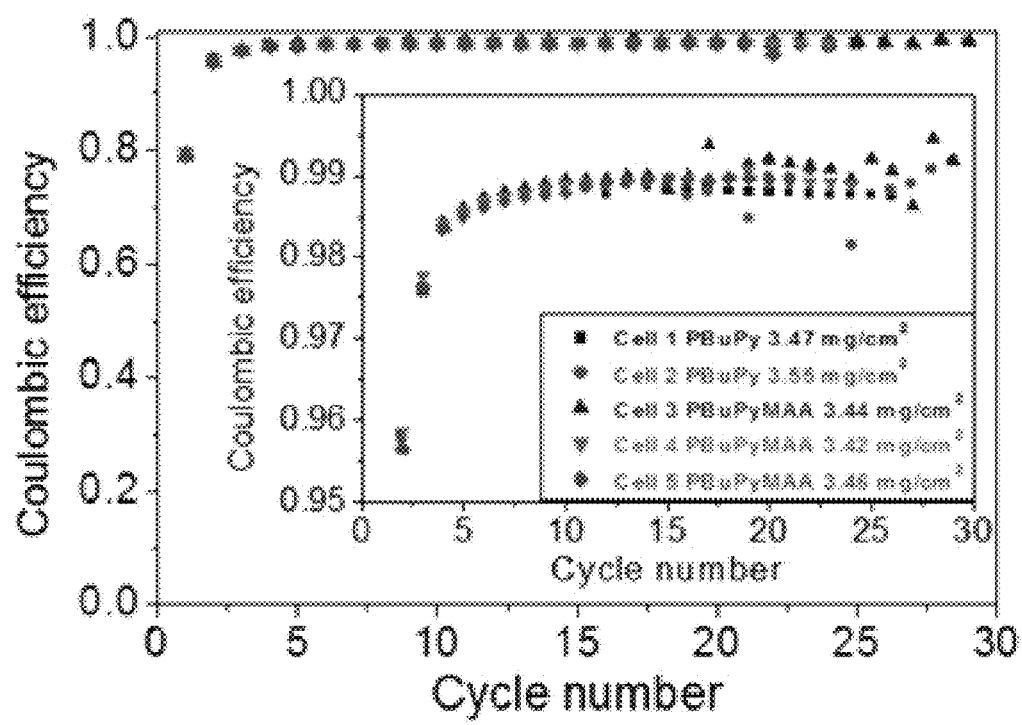
FIG. 5D illustrates the cycling performance at C/3 (running with CCCV in each step, cut-off at 1 hour) of both PBuPy and PBuPy-MAA in high-loading anode as coulombic efficiency vs. cycle number. (1C=1000 mA/g).
Figure 6A:
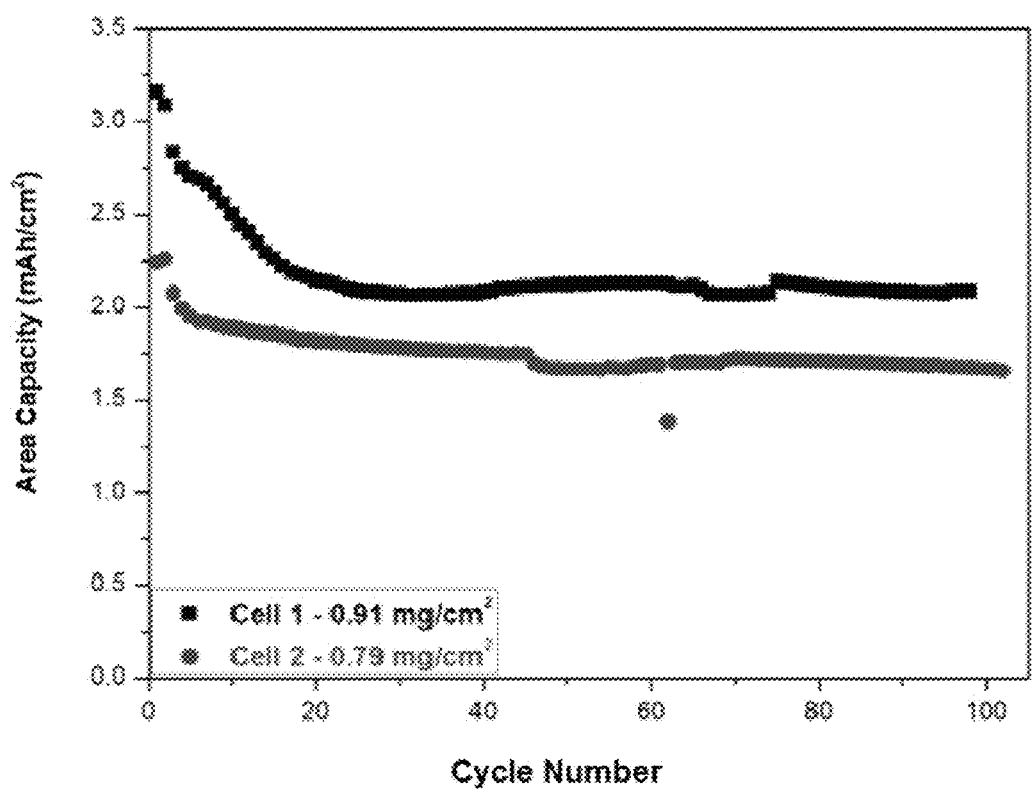
FIG. 6A illustrates the cycling performance at C/10 (running with CC) of PBuPy-MAA with Si in high-loading anode as area capacity (mAh/cm$^2$) vs. cycle number.
Figure 6B:
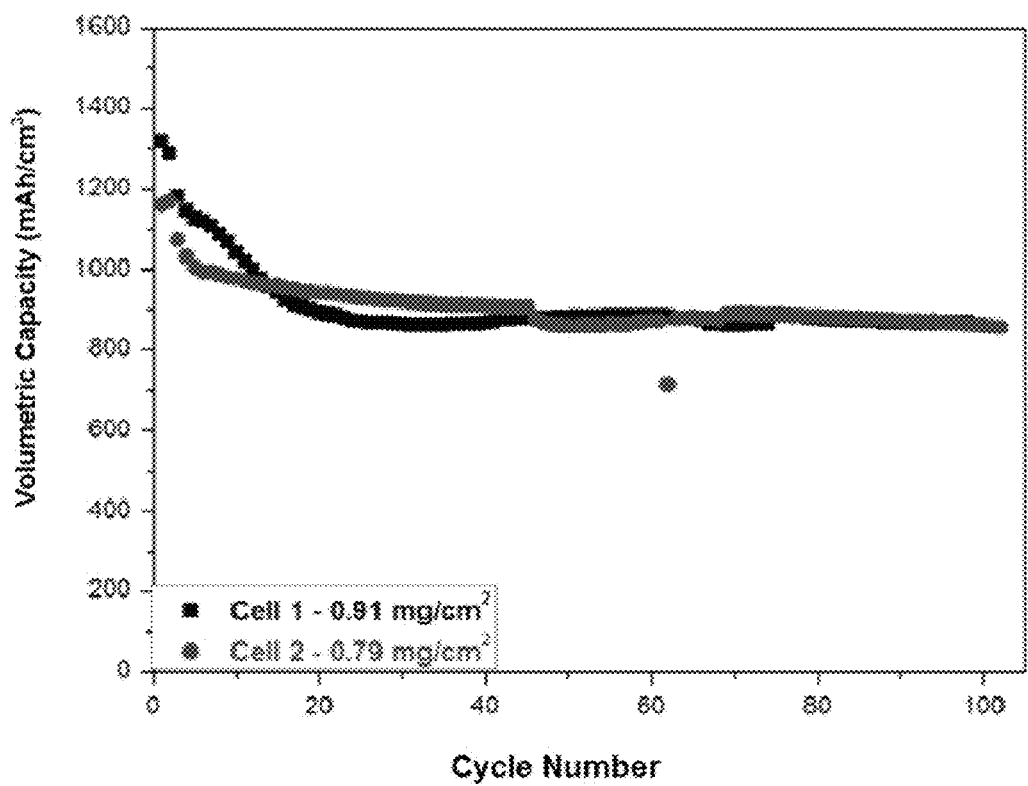
FIG. 6B illustrates the cycling performance at C/10(running with CC) of PBuPy-MAA with Si in high-loading anode as volumetric capacity (mAh/cm$^3$) vs. cycle number.
Figure 6C:
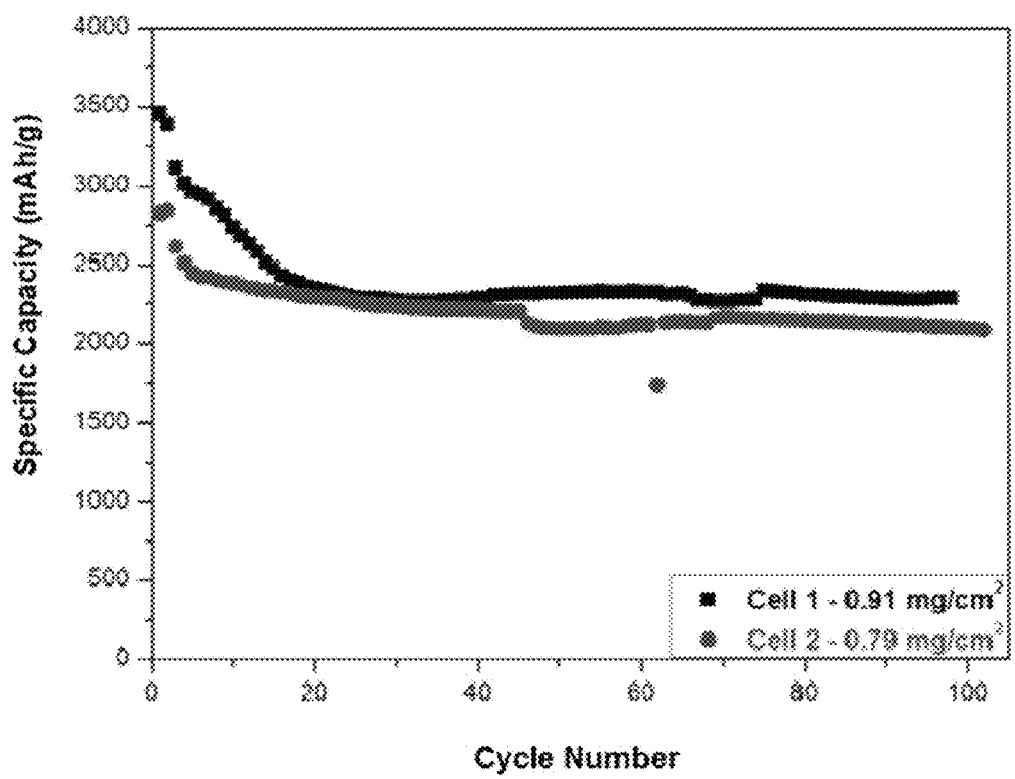
FIG. 6C illustrates the cycling performance at C/10 (running with CC) of PBuPy-MAA with Si in high-loading anode as gravimetric specific capacity (mAh/g) vs. cycle number.
Figure 6D:
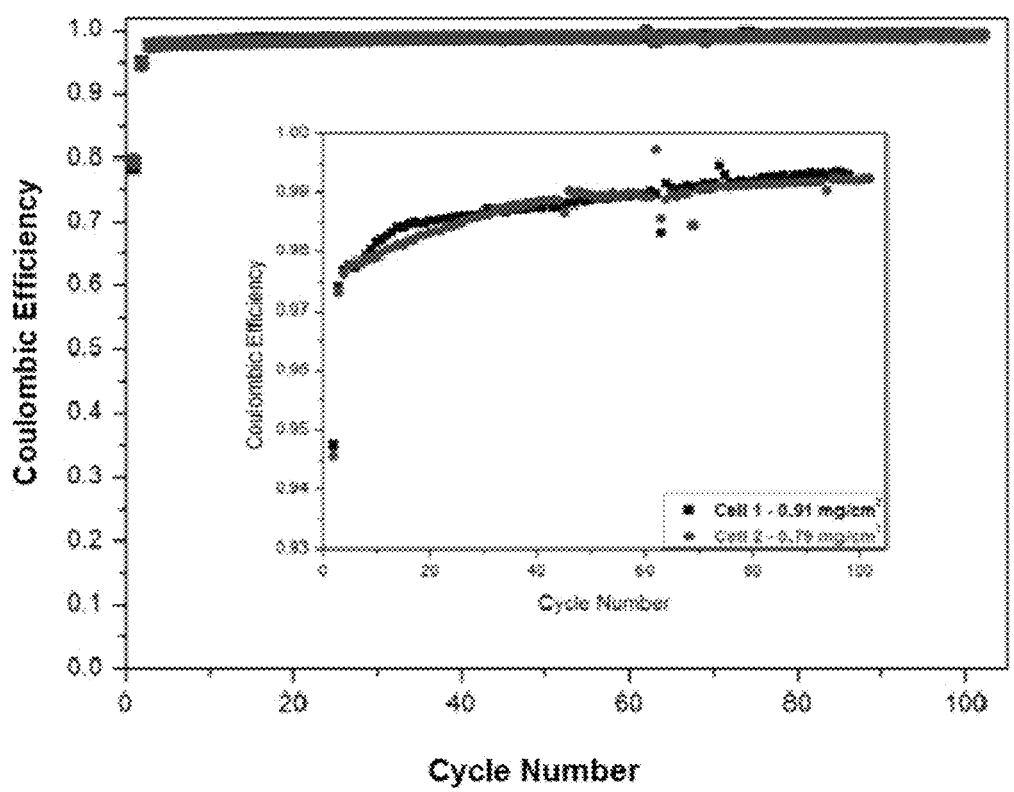
FIG. 6D illustrates the cycling performance at C/10 (running with CC) of both PBuPy-MAA with Si in high-loading anode as coulombic efficiency vs. cycle number. (1C=4200 mA/g).

Running with CCCV at C/3 (cut-off at 1 hour) was also tested for both pyrene based conductive polymers in high loading electrode. As FIG. 5A-C show, all five cells, with high mass loading (~3.5 mg/cm$^2$), show steady performance in charging capacity, giving virtually no irreversible capacity loss after the first two formation cycles. The results are favorable for high loading anode running at such fast cycling rate. Another observation is that when running with CCCV and applying cut-off at 0.02 C, the CV step can engage as long as 3-4 hours, contributing around 20% capacity during lithiation. However, when applying cut-off at 1 hour, a significant amount of discharge capacity is yet produced through this 1 hour CV step, composed of 20-25% during the whole lithiation process. Cells fabricated with PBuPy-MAA copolymer as the binder slightly exceeds the performance of the ones using the PBuPy homopolymer binder in the cell. This improved cycling performance is presumably owing to the adhesion functionality contributed from the carboxylic acid. FIG. 5D shows the columbic efficiency of all five cells underlining the fast decay for the first 20 cycles, before reaching an average capacity retention plateau. The different binder types used (PBuPy or PBuPy-MAA) do not show any obvious difference in their electrochemical performance/behavior.

To further evaluate PBuPy-MAA as a versatile binder, electrodes were prepared combining pure Si nanoparticles (50-70 nm) and PBuPy-MAA conductive binder with different mass loading (see FIG. 6). For example, FIG. 6A illustrates the cycling performance at C/10 running with CC of PBuPy-MAA with Si in high-loading anode as area capacity (mAh/cm$^2$) vs. cycle number, volumetric capacity (mAh/cm$^3$) vs. cycle number (see FIG. 6B), gravimetric specific capacity (mAh/g) vs. cycle number (see FIG. 6C), and coulombic efficiency vs. cycle number (see FIG. 6D). As seen from FIG. 6, the PBuPy-MAA binder of the present invention exhibits remarkable cycling performance even in combination with pure Si particles. The first cycle coulombic efficiency is 79% for both of the two cells (see FIG. 6D). The cells ran steady after a decline during first 10 cycles, reaching an area capacity above 2 mAh/cm$^2$ and a volumetric capacity around 900 mAh/cm$^3$, and retaining almost 70% capacity up to 100 cycles at C/10 (see FIG. 6A-C).

The results presented herein successfully establish the effectiveness of PBuPy and PBuPy-MAA conductive polymers as binders for lithium ion battery applications. Both PBuPy and PBuPy-MAA binders offer better binding strength, and much improved capacity retention and efficiency compared to using conventional binders.

It should be recognized that the one or more examples in the disclosure are non-limiting examples and that the present invention is intended to encompass variations and equivalents of these examples.

EXAMPLES

Chemicals: All the starting chemical materials for the synthesis of the conductive polymer were purchased from Sigma-Aldrich. Electrolytes were purchased from Novolyte Technologies (now part of BASF), including battery-grade lithium hexafluorophosphate (LiPF$_6$) in ethylene carbonate (EC), diethyl carbonate (DEC) and fluoroethylene carbonate (FEC). A Celgard® 3501 separator membrane was purchased from Celgard. Other chemicals were purchased from Sigma Aldrich and used without any further purification.

Electrode Compositions: All electrode laminates were made with conductive polymer binders and active anode materials in a NMP-based slurry. The active anode material silicon-graphene is commercially available and can be obtained from XG Sciences, Inc.

Slurry Preparation: a) added 0.1 g of PBuPy-MAA binder into 1 g of N-methyl pyrrolidone (NMP) and ultrasonicated for 10-15 minutes until the mixture turn into a homogenous solution; b) added 0.8 g of composite material containing 48% Si and 52% carbon (Gen 1.5, obtained from XG Sciences), and 0.1 g of graphene into the PBuPy-MAA/NMP solution, followed by the addition of the 1.2 g remaining NMP to carefully flush all the particles into the slurry. The mixture was well mixed by a homogenizer set at 2500 rpm for 1 hour.

Example pyrene-based conductive binders were synthesized as described in U.S. Pat. No. 9,153,353. The synthesis of binders 1-pyrenebutyl methacrylate, poly(1-pyrenebutyl methacrylate) (PBuPy), and poly(1-pyrenebutyl methacrylate-co-methacrylic acid) (PBuPy-MAA) can be prepared as described below.

Synthesis of 1-pyrenebutyl methacrylate

1-Pyrenebutanol (6 g) was dissolved in anhydrous $CH_2Cl_2$ (120 mL). Triethylamine (12 mL) and pyridine (5 mL) were added to the solution, and the mixture was cooled to 0° C. Then methacryloyl chloride (8.8 g) was added dropwise. After the addition, the ice-water bath was removed and the mixture was stirred for 1 hour. After water (75 mL) was added to the reaction flask, the solution was transferred into a separatory funnel and extracted with $CH_2Cl_2$. The extract was washed with aqueous HCl (1 M, 150 mL), aqueous $NaHCO_3$ (5%, 150 mL), and brine (150 mL). The solvent was removed and the crude product was recrystallized with methanol to obtain the final product as white powder (4.8 g, 64%). $^1$H NMR (500 MHz, $CDCl_3$): δ 8.27 (d, J=9.5 Hz, 1H), 8.17 (m, 2H), 8.11 (m, 2H), 8.03 (d, J=2 Hz, 2H), 7.99 (m, 1H) 7.87 (d, J=8 Hz, 1H), 6.09 (s, 1H), 5.54 (s, 1H), 4.23 (t, J=6.5 Hz, 2H), 3.40 (t, J=7.8 Hz, 2H), 1.97 (m, 2H), 2.00 (s, 3H), 1.85 (m, 2H) ppm. MALDI-TOF MS: Calculated: 342.44. Found: 342.07.

Synthesis of poly(1-pyrenebutyl methacrylate)(PBuPy)

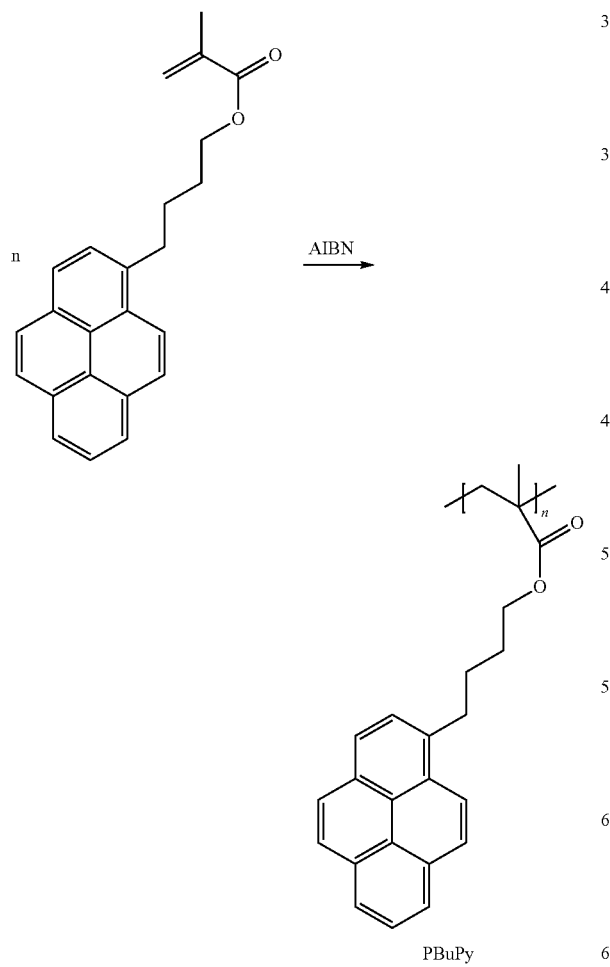

PBuPy

1-Pyrenebutyl methacrylate (1 g) was dissolved in freshly distilled THF (10 mL). To the solution, 2,2'-azobis(2-methylpropionitrile) (AIBN) (9.7 mg) was added. The mixture was degassed by three freeze-evacuate-thaw cycles and heated to 60° C. for 24 hours. The product was purified by precipitation with diethyl ether. (Product: 0.9 g) $^1$H NMR (500 MHz, $CDCl_3$): δ 7.75 (br), 3.83 (br), 2.81 (br), 1.98 (br), 1.50 (br), 0.98 (br) ppm. GPC ($CHCl_3$, polystyrene standards): $M_n$=7.3 kDa, PDI=2.9).

Synthesis of poly(1-pyrenebutyl methacrylate-co-methacrylic acid) (PBuPy-MAA)

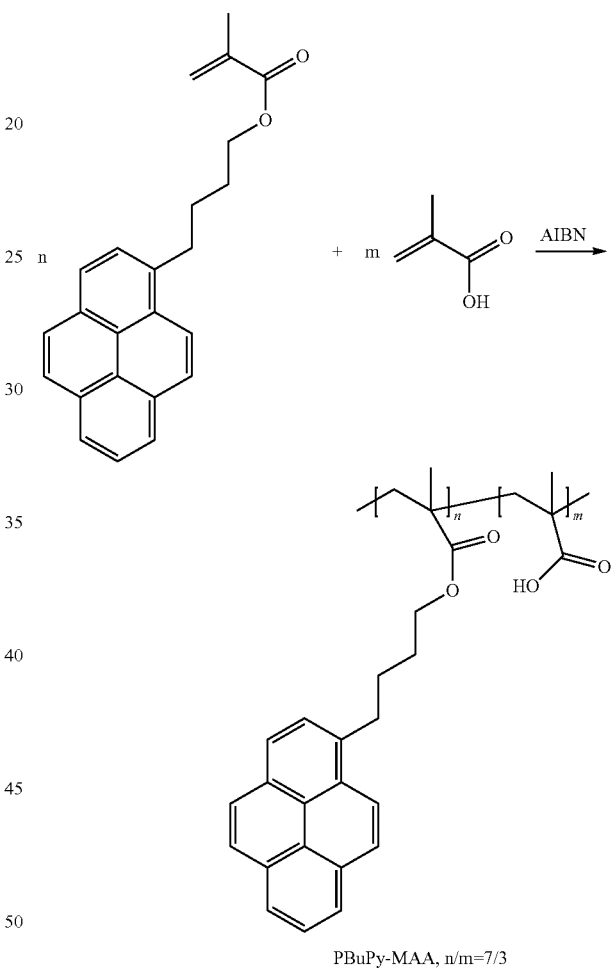

PBuPy-MAA, n/m=7/3

1-Pyrenebutyl methacrylate (1.03 g, 3 mmol) and methacrylic acid (0.11 g, 1.28 mmol) were dissolved in freshly distilled THF (20 mL). To the solution 2,2'-azobis(2-methylpropionitrile) (AIBN) (14 mg, 0.09 mmol) was added. The mixture was degassed by three freeze-evacuate-thaw cycles and heated to 60° C. for 24 hours. The product was purified by precipitation with diethyl ether. (Product: 1 g) $^1$H NMR (500 MHz, $CDCl_3$): δ 12.25 (br), 7.71 (br), 3.82 (br), 2.81 (br), 1.98 (br), 1.46 (br), 1.04 (br) ppm. GPC ($CHCl_3$, polystyrene standards, M=10.8 kDa, PDI=2.8).

Process for Making the Electrode:

Casting and Drying: a) the copper foil was wiped down with NMP solution to remove any residue impurities from manufacturing. The copper foil was allowed to dry under ambient conditions before casting slurry; b) the Mitutoyo doctor blade was set at a height of 150 μm (this procedure was for high loading anode used for cycling test. Higher loading can be achieved by setting the casting height at 200 μm). Before casting, one final mixing of the slurry was performed using the homogenizer set at 1000 rpm for 1 minute to eliminate any bubbles. Slurry was then poured adjacent to the doctor blade holder and allowed it to spread across the blade; c) the slurry was casted at a constant speed of 100 cm/min. After the casting has stopped, the laminate was allowed to dry for 30 minutes at room temperature. Turned the heat of the coater into 50° C. and dried for another 2 hours; d) once the laminate was visually dried, the heat was turned off to let it cool down to room temperature. Then punched the electrode to 9/16 inch in diameter and placed the punched electrodes into a vial. The vial was then put into a vacuum oven at 130° C. for 12 hours under high vacuum to completely remove water and solvents. Electrodes selected for cell performance test were around 5 mg in weight, and 60 μm in thickness. Parameter variations between all electrodes are within 5%.

Calendering: Gradually adjusted the gap of rollers of the calendering machine to ~60 μm and ~40 μm, applied the dry laminate into the gap to obtain laminates with desired thickness.

Process for Fabricating Coin Cell:

Coin cell assembly was performed using standard 2325 coin cell hardware. A 1.47 cm diameter disk was punched out from the laminate for use in the coin cell assembly as a working electrode. Lithium foil (obtained from FMC Corporation) was used in making the counter electrode. The counter electrodes were cut to 1.5 cm diameter disks. The working electrode was placed in the center of the outer shell of the coin cell assembly and two drops of 30% FEC, 1.2 M LiPF$_6$ in 70% EC/DEC=3/7 electrolyte purchased from BASF were added to wet the electrode. A 2 cm diameter of Celgard® 2400 porous polyethylene separator was placed on top of the working electrode. Three more drops of the electrolyte were added to the separator. The counter electrode was placed on the top of the separator. Special care was taken to align the counter electrode symmetrically above the working electrode. A stainless steel spacer and a Belleville spring were placed on top of the counter electrode. A plastic grommet was placed on top of the outer edge of the electrode assembly and crimp closed with a custom-built crimping machine manufactured by National Research Council of Canada. The entire cell fabrication procedure was done in an Ar-atmosphere glove box.

Process for Testing Coin Cell:

The coin cell performance was evaluated in a thermal chamber at 30° C. with a Maccor Series 4000 Battery Test System. All cells were tested with a cut-off voltage of 0.01 V-1V at C/10 (100 mA/g). The capacity of the material was calculated on the bases of the theoretical capacity and the amount of the materials used within the electrode.

What is claimed is:

1. A composite electrode for use in a lithium-ion battery, the composite electrode comprising:
    a silicon-graphene active material with a specific capacity between 500 and 3500 mAh/g; and
    a conductive polymer binder, wherein the conductive polymer binder has a polymeric composition with repeating units of the formula:

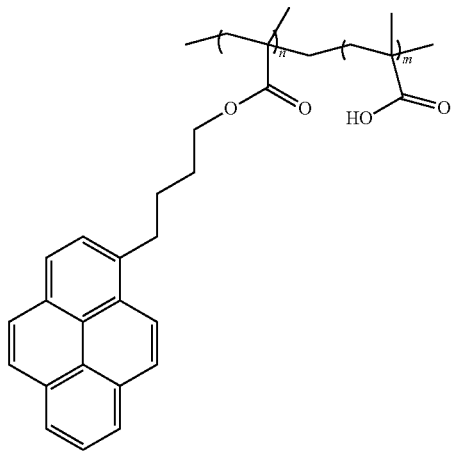

wherein n+m is between 10 and up to 10 million; and n/m ratio is 9/1 to 1/9.

2. The composite electrode of claim 1, wherein the n/m ratio is 7/3.

3. The composite electrode of claim 1, wherein the conductive polymer binder is a copolymer of 1-pyrenebutyl methacrylate and methacrylic acid.

4. The composite electrode of claim 3, wherein the methacrylic acid present in the copolymer is in an amount from about 30 to 78 mol % and the 1-pyrenebutyl methacrylate present in the copolymer is in an amount from about 22 to 70 mol %.

5. The composite electrode of claim 3, wherein the methacrylic acid present in the copolymer is in an amount from about 10 to 51 wt % and the 1-pyrenebutyl methacrylate present in the copolymer is in an amount from about 49 to 90 wt %.

6. The composite electrode of claim 1, wherein the electrode is comprised of about 1 to 20 wt % of polymer binder and about 80 to 99 wt % of silicon-graphene active material.

7. The composite electrode of claim 1, wherein the silicon-graphene active material contains about 10 to 99 wt % of Si and about 1 to 90 wt % of C.

8. The composite electrode of claim 1, wherein the electrode further comprises a graphene additive.

9. The composite electrode of claim 8, wherein the electrode is comprised of about 5 to 20 wt % of polymer binder, about 65 to 94 wt % of silicon-graphene active material and about 1 to 15 wt % of graphene additive.

10. A composite electrode for use in a lithium-ion battery, the composite electrode comprising:
    a silicon-graphene active material with a specific capacity between 500 and 3500 mAh/g; and
    a conductive polymer binder, wherein the conductive polymer binder is poly (1-pyrenebutyl methacrylate) having the following formula:

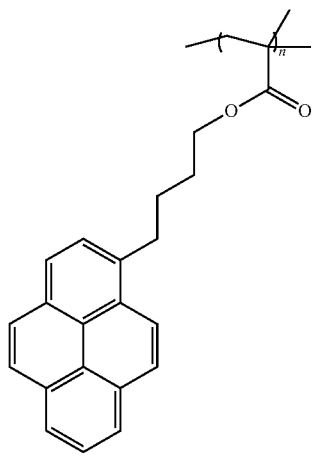

wherein n is between 10 and up to 10 million.

11. The composite electrode of claim 10, wherein the electrode is comprised of about 1 to 20 wt % of polymer binder and about 80 to 99 wt % of silicon-graphene active material.

12. The composite electrode of claim 10, wherein the electrode further comprises a graphene additive.

13. A method for making a composite electrode for use in a lithium ion battery, the method comprising the steps of:
  forming a solution of a solvent and a conductive polymer binder;
  adding a silicon-graphene active material to the solution to form a slurry;
  mixing the slurry to form a homogeneous mixture;
  depositing a thin film of said thus obtained mixture over top of a substrate; and
  drying the resulting composite to form said electrode,
  wherein the conductive polymer binder has a polymeric composition with repeating units of the formula:

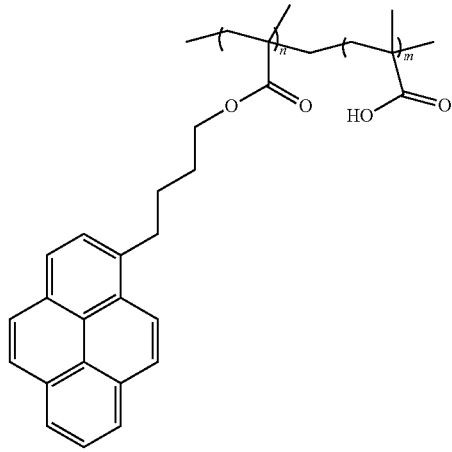

wherein n+m is between 10 and up to 10 million; n/m ratio is 9/1 to 1/9.

14. The method of claim 13, wherein the n/m ratio is 7/3.

15. The method of claim 13, wherein the conductive polymer binder is a copolymer of 1-pyrenebutyl methacrylate and methacrylic acid.

16. The method of claim 15, wherein the 1-pyrenebutyl methacrylate present in the copolymer is in an amount from about 22 to 70 mol % and the methacrylic acid present in the copolymer is in an amount from about 30 to 78 mol %.

17. The method of claim 13, wherein the electrode is comprised of about 1 to 20 wt % of polymer binder and about 80 to 99 wt % of silicon-graphene active material.

18. The method of claim 13, wherein the electrode further comprises a graphene additive.

19. The method of claim 18, wherein the electrode is comprised of about 5 to 20 wt % of polymer binder, about 65 to 94 wt % of silicon-graphene active material and about 1 to 15 wt % of graphene additive.

20. A method for making a composite electrode for use in a lithium ion battery, the method comprising the steps of:
  forming a solution of a solvent and a conductive polymer binder;
  adding a silicon-graphene active material to the solution to form a slurry;
  mixing the slurry to form a homogeneous mixture;
  depositing a thin film of said thus obtained mixture over top of a substrate; and
  drying the resulting composite to form said electrode,
  wherein the conductive polymer binder is poly (1-pyrenebutyl methacrylate) having the following formula:

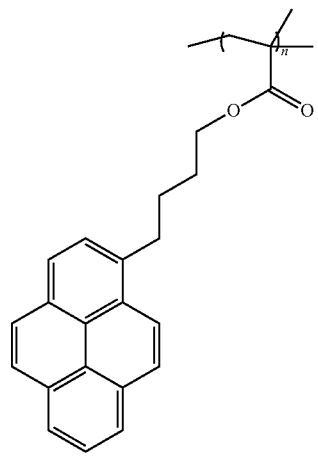

wherein n is between 10 and up to 10 million.

* * * * *